US006922558B2

(12) United States Patent
Delp et al.

(10) Patent No.: US 6,922,558 B2
(45) Date of Patent: Jul. 26, 2005

(54) INTEGRATED BUILDING CONTROL AND INFORMATION SYSTEM WITH WIRELESS NETWORKING

(76) Inventors: Don Delp, 4215G Coquine Cir., Bradenton, FL (US) 34208; Pat Renaldi, 9925 Laurel Valley, Bradenton, FL (US) 34202

( * ) Notice: Subject to any disclaimer, the term of this patent is extended or adjusted under 35 U.S.C. 154(b) by 0 days.

(21) Appl. No.: 09/036,721

(22) Filed: Mar. 6, 1998

(65) Prior Publication Data

US 2001/0055965 A1 Dec. 27, 2001

(51) Int. Cl.[7] .................................. H04M 3/00
(52) U.S. Cl. ................... 455/420; 455/419; 340/7.23
(58) Field of Search .................... 455/420, 536, 455/567, 423, 67.1, 67.7; 340/825.06, 539, 7.1, 7.23, 993; 700/90

(56) References Cited

U.S. PATENT DOCUMENTS

| | | | | | |
|---|---|---|---|---|---|
| 4,217,646 | A | * | 8/1980 | Caltagirone ................. | 364/493 |
| 4,308,911 | A | * | 1/1982 | Mandl ........................ | 165/209 |
| 4,446,454 | A | * | 5/1984 | Pyle ........................... | 340/538 |
| 4,567,557 | A | * | 1/1986 | Burns ......................... | 364/145 |
| 4,686,885 | A | * | 8/1987 | Bai ............................. | 89/6.5 |
| 5,103,391 | A | * | 4/1992 | Barrett ........................ | 700/4 |
| 5,132,681 | A | * | 7/1992 | Yabe et al. ............ | 340/825.55 |
| 5,138,649 | A | * | 8/1992 | Krisbergh ..................... | 379/56 |
| 5,588,038 | A | * | 12/1996 | Snyder ....................... | 340/7.1 |
| 5,598,456 | A | * | 1/1997 | Feinberg ..................... | 379/42 |
| 5,621,662 | A | * | 4/1997 | Humphries et al. ......... | 700/296 |
| 5,761,083 | A | * | 6/1998 | Brown, Jr. et al. ......... | 700/296 |
| 5,802,467 | A | * | 9/1998 | Salazar ....................... | 455/420 |
| 5,909,429 | A | * | 6/1999 | Satyanarayana et al. .... | 370/254 |
| 5,924,486 | A | * | 7/1999 | Ehlers et al. ................ | 165/238 |
| 6,061,604 | A | * | 5/2000 | Russ et al. .................... | 700/90 |
| 6,127,941 | A | * | 10/2000 | Van Ryzin ............. | 340/825.69 |
| 6,181,981 | B1 | * | 1/2001 | Varga et al. ................ | 700/236 |

\* cited by examiner

Primary Examiner—Charles Appiah
Assistant Examiner—Joy Contee
(74) Attorney, Agent, or Firm—Ward & Olivo

(57) ABSTRACT

This invention relates to an integrated building control and information system with wireless networking, including the controlling and/or monitoring of various building devices or appliances such as air conditioning, lighting, temperature, humidity, etc., including practically any environmental condition or mechanical operation. Also, the invention relates to a system which includes a vendor tracking system comprising an industrial operator interface, with communication, local data processing, and data storage capabilities, which provide an efficient information resource for service and product control. Additionally, the invention relates to a system including a utility monitoring and/or control system to monitor and/or control the facilities utilities such as electricity, gas, water, steam, etc., through revenue and non-revenue rated metering devices, allowing real-time demand side utility management through the controlled equipment. Additionally, this invention incorporates a wireless interface, of any combination of sub-systems, to increase the coverage area to include remote locations, within a radius up to 10 miles, and/or large facilities which exceed the limitation of hard wired components, resulting in cost reductions for installation and maintenance. In facilities such as shopping malls, office buildings, commercial and industrial complexes, the consolidated central management of energy consumption, building equipment, lighting, environmental control, and vendor services provides a substantial savings and effective use of limited natural resources.

28 Claims, 26 Drawing Sheets

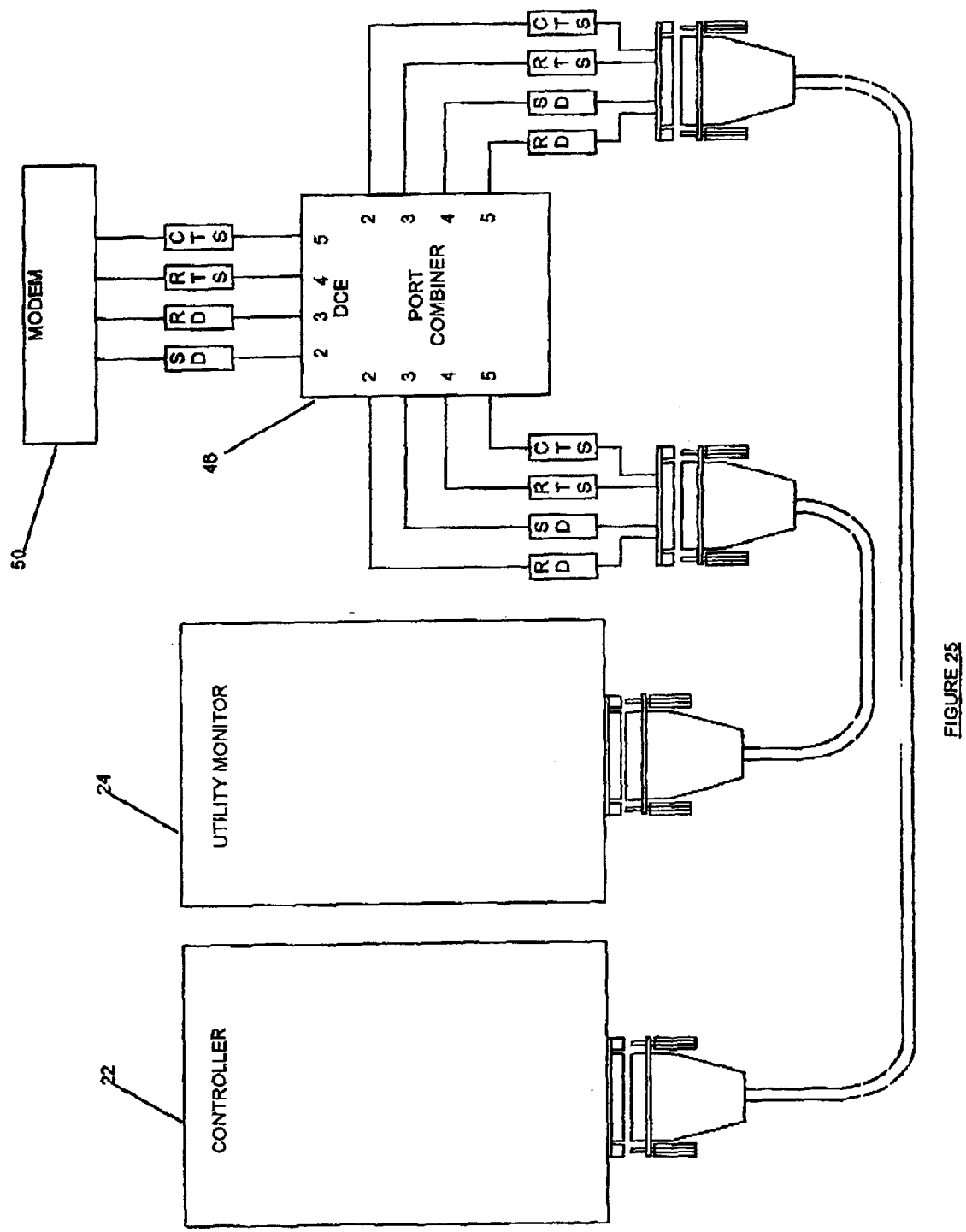

United States Patent US 6,922,558 B2

INTEGRATED BUILDING CONTROL AND INFORMATION SYSTEM WITH WIRELESS NETWORKING

TECHNICAL FIELD OF THE INVENTION

This invention relates to an integrated building control and information system, including the controlling and/or monitoring of various building devices or appliances such as air conditioning, lighting, temperature, humidity, etc., including practically any environmental condition or mechanical operation. Also, the invention relates to a system which includes a vendor tracking system comprising an industrial operator interface, with communication, local data processing, and data storage capabilities, which provide an efficient information resource for service and product control. Additionally, the invention relates to a system including a utility monitoring and/or control system to monitor and/or control the facilities utilities such as electricity, gas, water, steam, etc., through revenue rated metering devices, allowing real-time demand side utility management through the controlled equipment. Multi-site utility monitoring enables aggregation of several locations into a single purchasing entity thereby decreasing utility rates. Such a system precisely monitors energy consumption and enables accurate charging of the users in a multi-user building or compound. Additionally, this invention incorporates a wireless interface, of any or all system components, to increase the coverage area to include remote locations, within a radius up to 10 miles, and/or large facilities which exceed the limitation of hard wired components, resulting in cost reductions for installation and maintenance. In facilities such as shopping malls, office buildings, commercial and industrial complexes, the consolidated central management of energy consumption, building equipment, lighting, environmental control, and vendor services provides a substantial savings and effective use of limited natural resources.

BACKGROUND OF THE INVENTION

Building management systems do exist in buildings today. An example of an existing building management system is the Novar building management system that has the capability of environmental monitoring and mechanical control. The system architecture allows for a very flexible application of monitored inputs and controlled outputs. Sensors provide an interface to the monitoring input, such as thermistors, transmitters, timed contact closure, and various transducers. The controlled outputs are used as pilot control circuits to interface with relay devices, such as a contactor that contains a 24 volt magnetic coil. A thermostat completes the 24 volt control circuit which causes the contactor to close, starting the compressor. Another output is an analog signal such as a 4 to 20 milliamp current sink or source.

The existing Novar system is based on a master/slave communication network, the RS-485. The master coordinates all communication and is connected, by wire or fiber optic cable, to all slave modules. The master also provides the process commands that cause the slave modules to control the connected equipment.

For example, an air conditioning unit is interfaced to a slave module thereby removing the thermostat. The slave module processor has certain default settings for fan and room temperature which causes the compressors or heat element to cycle on and off while the fan runs continuously. When the slave module is connected to the Master, via a RS-485 digital network, the slave functions can be expanded to scheduled on and off times, setpoint adjustments, enthalpy control, and customized responses to other controlled equipment performance.

Another example of an existing building management system is described in the brochure "IFS 800 Lighting control system" published by Philips Lighting. In this system each appliance, such as a Luminaire, a heating or cooling device or a fan in a space, such as a room, office or shop area, is coupled with a central control system via a communication bus. In this particular system each appliance is controlled by a local controller unit which is connected to the communication bus and regulated by signals from the central control system. The local controllers comprise the necessary electronics for adjusting several appliances to required levels. An occupant of the space communicates a change of the desired levels to the control system by means of infra-red (IR) signals transmitted by a portable IR remote-control unit to an IR-receiver connected to the communication bus. Further, the known system allows additional determination of the desired levels by use of sensors, such as a presence detector, a thermometer or a light sensor.

Another known building management system, suitable for small complexes such as shops and restaurants, is the BatiBUS/ISIS system, commercialized by the company Merlin Gerin, Meylan, F-38240 France. In this system each appliance includes its own local controller which is connected to the communication bus. Security and alarms can be incorporated in this known system.

In the known systems, the local controllers and the appliances are connected to the communication bus by wires. In a modem office building or commercial complex this is a drawback as spaces are often changed. Changing virtually always requires displacement of the appliances and often also tearing down and rebuilding of internal walls. To achieve a flexible floor lay-out at low cost, a minimum of wiring in the walls is required. However, it is also required by the users of a building to have full control over the location of the appliances, consequently placing appliances on predetermined spots only is unacceptable. In all the above systems, the current problems comprising expense and physical limitation of connecting slave modules in multiple stores is obvious and often prohibitive. For example, take the situation where two stores in a mall shopping center are separated by one thousand feet. The first location has a Novar system while the second is using standard electro-mechanical devices. The second store location would clearly benefit from the energy savings of a Novar system, however, the cost to run a cable is prohibitive. Additionally, the building architecture could make such a wire connection nearly impossible, let alone cost prohibitive. The prior art necessitated another master be installed rather than add more slave modules to the existing system. Energy savings are thereby offset by the cost of a system and associated installation, and the recovery of those costs precedes financial benefit of energy savings. The installation of a complete master/slave(s) communication network caused many facilities to forego the use of such systems based on time to recover initial investment.

Alternatively, the vendor tracking system, which incorporates an industrial operator interface, is an entirely novel part of an embodiment the present invention. Simple single site vendor logging time-in and time-out can be accomplished through the use of security systems, bar code systems and time clock systems. However, the expense of installing and supporting such a system, in multiple locations, using wired digital networks, has made this device economically impractical in the past. The system communication architecture is also master/slave, RS-485, therefore, the same limitations exist when wire connection are used. An example of this system communication architecture is a device manufactured by Maple Systems.

Utility monitoring systems do exist in buildings today. An example of an existing utility monitoring system is the Interlane Utility Management System. The architecture of this typical system can be explained in three (3) main components. A utility node, transducer, and/or transmitter is applied to the incoming utility service which is to monitored. This provides an analog signal, typically pulse width modulation, although alternate systems employ signals such as 4–20 milliamp current sinking and direct current voltage ramping, which is connected to the main processor input.

Second, the main processor scans the status of the inputs, Interlane offers 9 possible inputs for each main processor, and retains the analog signals as digital information. Finally, a critical function for any utility system is data storage, or memory capacity. The data must be maintained for periods of time often exceeding 60 days.

The prior art has addressed the issue of site data gathering through several means. As described, the Interlane system employs analog signals, other systems have used power line carrier waves, injecting communication onto existing electrical lines. Another prior method has been through Ultra High Frequency, UHF, and 900 Megahertz transponders.

All of the above methodology has succeeding in facilities occupied by a single tenant or owner occupied buildings, and those structures with largely open floor plans. The prior art has succeeded in single site applications transmitting data to the exterior of the building or structure for utility gathering purposes of local utility providers, thus improving the efficiency of data collection.

However, the present invention embodies the high data throughput capacity to handle multiple site inputs combined with multiple sites. The limited number of inputs is predicated on reducing the cost of each respective system, since severe physical limitations exist for analog systems, the system must be reduced to entice the moderate size facility, 10,000 to 50,000 square feet. Although the main processor is capable of handling more information, the successful systems have downsized its input capability and consequently, the cost.

The systems which employ power line carrier wave technology have encountered market resistance from primarily multi-tenant facilities and property management service personnel. The application of communication bridges across service panels and transformers, which is necessary to utilize the entire electrical distribution system as a communication network, has caused concern of both electrical failure and interference with connected electrical appliances and/or devices. Both issues are liabilities of this prior art.

UHF/900 MHZ transponder systems have succeeding in short range application, typically within a single facility of moderate size. The prevalence of outside interference for both frequency ranges has been the paramount obstacle. The power output of the radio transceiver must be increased substantially to penetrate these interferences, which creates site licensing requirements by the Federal Communication Commission, FCC.

The application of 2.4 Gigahertz microwave radio frequency, combined with spread spectrum and frequency hopping technology increases the resilience of low power transmission to outside interference. Spread spectrum provides multiple frequency broadcast, whose propagation characteristics are best represented by a dome. The center band, or peak of the dome, represents the optimum output power of the transmitter. The sloping sides of the dome represent the additional transmission bands, or frequencies, as they descend in strength. This invention employs a total of 15, distinct transmission bands, although this can be modified based on transceiver. Frequency hopping dynamically redefines the center band, or peak of the dome. This necessitates an algorithm to realign the spread, or descending side bands, used for spread spectrum. This invention clearly is an improvement of the prior art through a new, and unique combination of microwave technology, advanced logic capability of the radio transceiver, and digital conversion technology compatible with various data collection devices.

The present invention embodies several advantages over the conventionally wired sub-systems, of which the integration is also new, is part of this invention. The limitations which exist for all hard wire systems is inherent to the restrictions which occur when installing cabling. The cost considerations are primarily labor related, although in certain instances, the cable can be quite costly. First, the labor factor, or installation cost directly attributable to personnel, must be weighed against the equipment cost. The advantage of this invention is the economic incentive which it will provide in large facilities or compounds, such as a shopping mall.

A business establishment within a shopping mall can benefit from reduced utility costs and new management information resources. The present system offers an economical advantage to the establishment by proving increased building efficiency and management control and information. If a shopping mall or other building complex uses independent or stand alone installations of each prior art sub-system, the cost is increased thereby increasing the time for return on the investment. Typically, such capital investments are based on 5 years, or less, for the return to be realized.

There exists several benefits of employing the configuration and wireless network of this invention. Within a single location, the costs associated with cable installation may prove economical to use of a wireless network within the confines of that space. Although, the overall cost may be less to run cabling within the site using the prior art system architecture and equipment, but the benefit of the wireless application becomes obvious when additional locations are considered. The wireless network of the present invention provides an adaptable format for much system expansion.

The installation cost to add an additional location or site is typically much more due to the structural design of the location, whether it be the underground installation, which may require extensive destructive and/or non-destructive investigation to find the best path, or the aesthetics/cosmetics of the structures. Hence, the prior art reverted to independent systems which require a new base or master in each location. This again resulted in escalated costs as a consequence of only a short distance or physical separation of the sites.

Due to sophisticated building design and architecture, is often not feasible to physically interconnect multiple locations within the overall structure. For example, a shopping mall designed with large glass enclosed atriums and inner-city installations. Conversely, large distances between sites create a similar barrier. Also, an commercial, office or industrial park is often configured with many free-standing structures. These structures are maintained and/or operated by the property management group, which is required to treat each facility as independent unless substantial investment is made into underground or overhead networks. Such networks, fiber optic or cabling, is economically prohibitive to many developers. Furthermore, use of public utilities, such as telephony devices, incur repetitive expenses, also making the prior art methods using independent systems very cost prohibitive.

In contradistionction, an added benefit of the system of the present invention is the inherent distribution of the system cost as additional locations are added. The base, or master, system of this invention is a fixed, one time expenditure which, based on this invention, can adapt to additional location without consequential base hardware costs. Therefore, additional stores reduce the actual cost of the base system based on the number of locations set up on the wireless network.

The prior art methods and systems required a recurring base (or master) which, in turn, repeated the hardware cost, in addition to the associated slave modules and control devices. This is eliminated by the system of the present invention. Once the system of this invention is installed in one geographical area it creates an omnidirectional and/or directional network capable of supporting dissimilar structures over a large range of area. This, in turn, further reduces the overall system cost.

Also, this invention can be used as a "shared tenant services" provider in any of a number of large, multi-tenant complexes to provide such services as telephony, video, etc. The system of this invention can bypas the local communication network, such as phone service, cable service, security service, etc., and can actually become a service provider such as a security service.

Finally, due to the progressive design of this invention and its compatibility with associated technologies, several alternate sub-system formats can be employed. As discussed herein, the high throughput data rate of microwave radio transmissions predicated its development. Large microwave data transmission stations have been employed for both public and private communications. Such communications include digital audio, digital video, and digital voice transmission. As provided below in the detailed description, alternate sub-system network capability is another novel feature of this invention.

SUMMARY OF THE INVENTION

The present invention relates to a wireless building control and information system with a vendor tracking system, controlling and/or monitoring various building devices or appliances such as air conditioning, lighting, temperature, humidity, etc., including practically any environmental condition or mechanical operation. Additionally, the wireless system incorporates a vendor tracking system comprising an industrial operator interface terminal (i.e., essentially a keypad and display screen) with data processing and storage capabilities. Such a system is designed for use as the central management system of large buildings, such as shopping malls containing several individual stores, office buildings, industrial complexes, etc., and functions to control lighting, heating, air conditioning, ventilation, etc. In buildings like malls, offices, and industrial complexes, the central management of energy consuming services allows a relatively easy adjustment of the level of light or temperature to the actual existing demand at any moment. This results in considerable savings of energy and costs. Such a system precisely monitors energy consumption and enables accurate charging of the users in a multi-user building. Such a building management system can also be used for peak saving purposes to comply with the requirements of an electric company to keep power consumption below an agreed maximum level.

The following presents a brief summary of the present invention. As discussed above, the present invention relates to a building management control system including vendor tracking capability. More specifically, this invention relates to a wireless control system that controls the air conditioning, lighting, temperature, humidity, etc., practically any environmental condition or mechanical operation can be controlled and/or monitored through the appropriate interface or sensor. Additionally, the wireless system incorporates a vendor tracking system comprising an industrial operator interface terminal (i.e., essentially a keypad and display screen) with some data processing and storage capabilities. This operator interface allows programmable menus to direct a vendor through a series of questions and/or statements, some of which prompt a response. The response is made through a designated key on the keypad, which is then embedded as a variable. This variable is then stored in a database, and the computer is polled or programmed to contact a remote location, to transmit this data.

It is therefore an object of the present invention to provide a wireless building management control system that controls the appliances in a large complex (i.e., a mall, an office building, an industrial complex, etc.). An advantage of such a system is that it does not require rewiring when appliances are displaced, additional appliances are added or appliances are removed from the particular space. The system thereby allows flexible positioning of appliances together with maximum control by the system.

To this end, a system according to the present invention is characterized by slave modules comprising a receiver for receiving wirelessly transmitted signals, and by a master controller/module coupled to the communication bus for wirelessly transmitting signals to all (or specifically selected) slave modules in response to signals from the communication bus. The communication or control signals that are emitted by the control system to the slave modules are transmitted via a communication bus to a location near the appliance to be controlled and/or monitored. From there, the signals are wirelessly transmitted to the appliance. Wiring for the last several meters towards the appliance is not required and the exact position of the appliance, provided it being within reach of the signals transmitted wirelessly by the slave module, is of no relevance to the transmission of these signals. Adding a new piece of equipment in the space, for example a ceiling fan or air conditioner, does not need an extension of the communication bus to the new piece of equipment in order to incorporate it into the system.

The transponder may be suitable and is constructed so as to transmit signals for all kinds of appliances used within the framework of a building management system. Transponders can be fixedly arranged at regular distances inside a building, for example in the ceilings, and no wiring changes are needed when the internal layout of the building is changed. Several appliances can be reached simultaneously and served by signals from one transponder.

An embodiment of a system according to this invention is characterized in that the transponder includes a transmitter for generating signals for wireless transmission, and a processor for conversion of signals received via the communication bus into a format suitable for wireless transmission. Herein, the processor is arranged to hold back the signals that are not meant to reach the appliances by the wireless transmission of signals via the transponder. Also, the system can be modular. In other words, the central control system does not need to have detailed information about the kind of signals necessary to adjust or control each individual appliance. In addition, an appliance is to be addressed via its transponder, so the appliance itself need not have a unique address within the complex. Interchanging of appliances between different rooms is thereby facilitated. Also signals on the communication bus which are not intended for the appliances served by a particular transponder will not be transmitted to those appliances. Further, in a large complex many signals are transmitted via the communication bus. Therefore, unnecessary activation of transmitters and possible unintentional activation of an appliance by a combination of "background" signals is avoided.

Additionally, the building management system according to the present invention serves a large number of appliances while each transponder only serves a limited number of appliances. As a further advantage, the transponder includes a "filter" to allow transmission by the transponder to occur at a lower rate than communication in the bus, making the system as a whole faster because different transponders may be transmitting different signals concurrently.

A preferred embodiment of a system according to the present invention comprises a plurality of slave modules that are provided with a transmitter and receiver for wireless transmission and reception of signals. Also, the master control module comprises a transmitter and receiver for transmitting and receiving wireless signals. Two-way communication between the control system and the appliance is therefore possible. For example, the processor may request status information from the appliance or the appliance can signal malfunctioning.

Another embodiment of a system according to the invention is characterized in that the system further comprises a portable remote control unit for wireless transmission of signals to the appliances. The occupant in a room can change the setting of an appliance directly without communication with the control system and additional data load on the communication bus. Preferably, status information about the new setting is sent to the control system, immediately or upon request.

In addition, this embodiment of a system according to the invention can be characterized in that the slave module comprises a receiver for receiving signals wirelessly transmitted by the remote control unit and in that the slave module comprises a device for retransmission of a signal received from the remote control unit, via the communication bus or via the slave module's wireless transmitter. Communication between a user or occupant of a building or room and the control system is done via the slave module and the communication bus. No other way of communication, such as calling a system manager or operator, would be necessary. This is, for example, desirable when an individual store (or room in an office building) is used outside normal hours to inform the system that lighting and heating should stay switched on. In a more developed embodiment the processor in the slave module and/or the control system can be (re)programmed via the remote control unit. Retransmission of received signals via the slave module's transmitter allows amplification of signals emitted by the remote control unit to ensure proper reception by the appliances.

An embodiment of a building management system according to the invention is further characterized in that the slave module comprises means for filtering and modification of a signal received from the remote control unit prior to its retransmission. Herewith, it is possible to use a simple remote control unit, whereby the appliances which are activated by use of the remote control unit are selected by the control system.

A further embodiment of a system according to the invention is characterized in that the remote control unit is provided with a receiver for receiving signals wirelessly transmitted by the slave module and a display for displaying thereupon messages transmitted by signals. Two-way communication between the slave module and a remote control unit allows the user of the remote control unit to obtain information about the building management system and the status of the appliances near him. It is known, for example, from GB-A2166328, that information is transmitted about the status of a device to a remote control unit via a communication bus and a transponder. However, in the known system the equipment is directly connected to the communication bus and the transponder is arranged to communicate with the remote control unit only. This known system is not a building management system and does not comprise a control system.

A preferred embodiment of a system according to the invention is characterized in that a slave module comprises an infra-red transmitter, and the appliance comprises an infra-red receiver and the ratio between the power of infra-red signals transmitted by said transmitter and the minimum power for activation of the receiver is at least of the order of magnitude of $10^8$. In order to allow maximum flexibility in changing the lay-out of a building, the slave module preferably is not to be arranged in walls. Internal walls are easily removable, while external walls may be too far away from the appliances in a building, therefore the preferred place for a slave module is in the ceiling. As the receiver in an appliance should be reached also by a remote control unit held at about one meter above the floor anywhere in the space, the orientation of the receiver cannot be optimized for receiving signals from the direction of the transponder. In this embodiment the transmitter in the transponder emits a signal sufficiently strong that even after reflection at surfaces of equipment or at the walls the signal is successfully transmitted. The indicated ratio allows a transmission path with a length of about 6 meters with a 90% energy loss due to reflections. It was found that this is sufficient for a conventional office environment.

As a solution to the shortcomings of the prior building management systems, the present invention provides wireless transmission of data associated with control system and vendor tracking system, thereby resolving both the wiring challenge of controlling multiple locations with a single "master" control unit, as well as the integration of both the control and vendor tracking systems. The present utilizes a wireless transmitter/receiver which uses the 2.4 Gigahertz, microwave, radio frequency band. This technology is proven as reliable with excellent interference resistance, and is currently used for many data applications. Applying this technology to the specific application disclosed herein has been accomplished by integrating a data format converter with the wireless transmitter/receiver, which will be referred to as the "wireless device" for the remainder of this application.

First, the Novar RS485 data network master/slave communication protocol was converted to a RS-232 format. The RS-485 is an asynchronous, multi-drop data communication method, typically having more than two devices attached. This method of communication is very efficient for small amounts of data transfer over long wire runs (e.g., several thousand feet). Here, each slave module is assigned a specific address or number. The data is sent out on the network with the address as the leading piece of data, modules will ignore any information without it's assigned address. However, modules cannot communicate between each other.

On the other hand, the RS-232 is a synchronous or an asynchronous communication usually between two devices, such as a computer and a printer or modem. This method of communication is very efficient for large amounts of data over very short distances (e.g., under ten feet). Therefore, the RS485 to RS-232 conversion is necessary to accommodate the interfacing of modern equipment on the Novar RS485.

Second, the wireless device is able to packetize, or bundle, the converted data for transmission. This is accomplished by establishing a data processing format based on the minimum and maximum data size from the Novar system and the timing of this data, down to each respective bit. With this format, certain code is added to the front and back of each packet. This code is necessary for the receiving wireless device to recognize, accept, and remove the added pieces of code. The remaining data is identical to the data originally produced by the Novar system and is now sent through an RS-232/RS485 converter, and subsequently, through the wire connected to the slave modules. Once this data is received by the slave module, it generates a response which is handled in the same fashion just described. This entire process should occur within a very short time (e.g., fifty milliseconds) or the master will designate a communication failure.

Another object of the present invention is the integration of a vendor tracking system into the "wireless" network briefly described above by simulating the same speed and data format of the Novar system. Since this network is an RS485 configuration, the information sent over the network for the vendor tracking modules will be ignored by all other devices. The vendor tracking master separate computer/processor serves as the administrator of the injected information. The pauses or gaps between the Novar data transmission are used for the vendor tracking system data communication.

Alternatively, the vendor tracking system of the present invention may be used in conjunction with known customer profiling apparatus and methods. Some of these comprise methods for selectively dispensing discount coupons as described in U.S. Pat. Nos. 5,612,868, 5,173,851, 4,910,672, 4,723,212 and 4,882,675, and automated purchase reward systems as described in U.S. Pat. No. 5,056,019.

As alternative embodiments of the system of the present invention, briefly described below are several specific embodiments in accordance with the present invention, none of which are deemed herein to be a more preferred embodiment over any other embodiment.

The present invention provides an integrated building control and information system comprising, first, a central processing unit, port combiner, master controller, slave controller modules, utility monitor, utility monitor node(s)s, vendor tracking slave modules, master microwave radio transmitter/receiver, data conversion circuitry, and utility node(s) simulator. Second, the present invention provides a satellite-integrated building control and information system comprising a satellite microwave transmitter/receiver, data conversion circuitry, vendor tracking slave modules, slave controller modules, utility monitor node(s), and utility monitor node(s) analog to digital conversion circuitry.

Controlling and/or monitoring of various building devices or equipment such as heating, ventilation, air conditioning, lighting, temperature, humidity, pedestrian traffic flow, etc., including practically any environmental condition or mechanical operation is an object of the present invention. Additionally, a vendor tracking system comprising an industrial operator interface, with communication, local data processing, and data storage capabilities, which provides an efficient information resource for service and product control. Facility monitoring of utilities such as electricity, gas, water, steam, etc., through revenue or non-revenue rated metering devices, allowing real-time demand side utility management through the controlled equipment. Also, this system incorporates a wireless interface of any or all system components to increase the system's coverage area to include remote locations, e.g., up to 10 mile radius, and/or large facilities which exceed the limitation of hard wired components, thereby resulting in cost reductions for installation and maintenance.

Alternatively, the present invention provides an integrated building control and information system comprising a central processing unit, port combiner, master controller, slave controller modules, utility monitor, utility monitor node(s), and vendor tracking slave modules. Controlling and/or monitoring of various building devices or equipment such as heating, ventilation, air conditioning, lighting, temperature, humidity, pedestrian traffic flow, etc., including practically any environmental condition or mechanical operation is an object of the present invention. Also, a vendor tracking system comprising an industrial operator interface, with communication, local data processing, and data storage capabilities, provides an efficient information resource for service and product control. Facility monitoring of utilities such as electricity, gas, water, steam, etc., through revenue or non-revenue rated metering devices, allows real-time demand side utility management through the controlled equipment.

Another alternative of the present invention provides an information system comprising, first, a central processing unit, vendor tracking slave modules, master microwave radio transmitter/receiver, data conversion circuitry. Second, this invention provides an information system comprising a satellite microwave transmitter/receiver, data conversion circuitry, and vendor tracking slave modules.

In this embodiment, a vendor tracking system comprising an industrial operator interface, with communication, local data processing, and data storage capabilities, provides an efficient information resource for service and product control. Additionally, this system incorporates a wireless interface, of any or all system components, to increase the coverage area to include remote locations, e.g., up to 10 mile radius, and/or large facilities which exceed the limitation of hard wired components, resulting in cost reductions for installation and maintenance.

Alternatively, the present invention provides an information system comprising a central processing unit and vendor tracking slave modules. A vendor tracking system comprising an industrial operator interface, with communication, local data processing, and data storage capabilities, provides an efficient information resource for service and product control.

Yet another alternative embodiment of the present invention provides an integrated controller system comprising a master controller, slave controller modules, master microwave radio transmitter/receiver, and data conversion circuitry. Controlling and/or monitoring of various building devices or equipment such as heating, ventilation, air conditioning, lighting, temperature, humidity, pedestrian traffic flow, etc., including practically any environmental condition or mechanical operation is an object of this invention. Additionally, this system incorporates a wireless interface, of any or all system components, to increase the coverage area to include remote locations, e.g., up to 10 mile radius, and/or large facilities which exceed the limitation of hard wired components, resulting in cost reductions for installation and maintenance.

Yet another alternative embodiment of the present invention provides an integrated utility monitoring system comprising, first, a master microwave radio transmitter/receiver, utility node(s) simulator, utility monitor, utility monitor node(s). Second, the present invention provides a satellite-integrated utility monitoring system comprises of a satellite microwave transmitter/receiver, utility monitor node(s), and utility monitor node(s) analog to digital conversion circuitry. Facility monitoring of utilities such as electricity, gas, water, steam, etc., through revenue or non-revenue rated metering devices, allowing real-time demand side utility management through the controlled equipment is an object of this aspect of the present invention.

Yet another embodiment of the present invention provides an integrated building control and information system comprising, first, a port combiner, master controller, slave controller modules, utility monitor, utility monitor node(s), master microwave radio transmitter/receiver, data conversion circuitry, and utility node(s) simulator. Second, the present invention provides a satellite-integrated building control and information system comprising a satellite microwave transmitter/receiver, data conversion circuitry, slave controller modules, utility monitor node(s), and utility monitor node(s) analog to digital conversion circuitry. Controlling and/or monitoring of various building devices or equipment such as heating, ventilation, air conditioning, lighting, temperature, humidity, pedestrian traffic flow, etc., including practically any environmental condition or mechanical operation is an object of this invention.

Facility monitoring of utilities such as electricity, gas, water, steam, etc., through revenue or non-revenue rated metering devices, allowing real-time demand side utility management through the controlled equipment. Additionally, this system incorporates a wireless interface, of any or all system components, to increase the coverage area to include remote locations, e.g., up to 10 mile radius, and/or large facilities which exceed the limitation of hard wired components, resulting in cost reductions for installation and maintenance.

Yet another embodiment of the present invention provides an integrated building control and information system comprising, first, a port combiner, master controller, slave controller modules, utility monitor, and utility monitor node(s)s. Controlling and/or monitoring various building devices or equipment such as heating, ventilation, air conditioning, lighting, temperature, humidity, pedestrian traffic flow, etc., including practically any environmental condition or mechanical operation is an object of this invention. Facility monitoring of utilities such as electricity, gas, water, steam, etc., through revenue or non-revenue rated metering devices, allows real-time demand side utility management through the controlled equipment.

Yet another embodiment of the present invention provides an integrated building control and information system comprising, first, a central processing unit, master controller, slave controller modules, vendor tracking slave modules, master microwave radio transmitter/receiver, and data conversion circuitry. Second, the present invention provides a satellite integrated building control and information system comprising a satellite microwave transmitter/receiver, data conversion circuitry, vendor tracking slave modules, and slave controller modules.

Controlling and/or monitoring of various building devices or equipment such as heating, ventilation, air conditioning, lighting, temperature, humidity, pedestrian traffic flow, etc., including practically any environmental condition or mechanical operation is an object o this invention. A vendor tracking system comprising an industrial operator interface, with communication, local data processing, and data storage capabilities, provides an efficient information resource for service and product control. Additionally, this system incorporates a wireless interface, of any or all system components, to increase the coverage area to include remote locations, e.g., up to 10 mile radius, and/or large facilities which exceed the limitation of hard wired components, thereby resulting in cost reductions for installation and maintenance.

Yet another embodiment of the present invention provides an integrated building control and information system comprising, first, a central processing unit, master controller, slave controller modules and vendor tracking slave modules. Controlling and/or monitoring of various building devices or equipment such as heating, ventilation, air conditioning, lighting, temperature, humidity, pedestrian traffic flow, etc., including practically any environmental condition or mechanical operation is an object of this invention. A vendor tracking system comprising an industrial operator interface, with communication, local data processing, and data storage capabilities, provides an efficient information resource for service and product control.

Yet another alternate embodiment of the present invention provides an integrated building control and information system comprising, first, a central processing unit, utility monitor, utility monitor node(s)s, vendor tracking slave modules, master microwave radio transmitter/receiver, and data conversion circuitry. Second, the present invention provides a satellite integrated building control and information system comprising a satellite microwave transmitter/receiver, data conversion circuitry, vendor tracking slave modules, utility monitor node(s)s, and utility monitor node(s) analog to digital conversion circuitry.

Facility monitoring of utilities such as electricity, gas, water, steam, etc., through revenue or non-revenue rated metering devices, allowing real-time demand side utility management through the controlled equipment is an object of this aspect of the present invention. A vendor tracking system comprising an industrial operator interface, with communication, local data processing, and data storage capabilities, provides an efficient information resource for service and product control. Additionally, this system incorporates a wireless interface, of any or all system components, to increase the coverage area to include remote locations, e.g., up to 10 mile radius, and/or large facilities which exceed the limitation of hard wired components, thereby resulting in cost reductions for installation and maintenance.

Yet another alternate embodiment of the present invention provides an integrated building control and information system comprising, first, a central processing unit, utility monitor, utility monitor node(s)s, and vendor tracking slave modules. Facility monitoring of utilities such as electricity, gas, water, steam, etc., through revenue or non-revenue rated metering devices, allowing real-time demand side utility management through the controlled equipment. A vendor tracking system comprising an industrial operator interface, with communication, local data processing, and data storage capabilities, provides an efficient information resource for service and product control. The operator interface terminal of the vendor tracking system comprises a keypad, display screen, and resident communication, data processing and data storage capabilities. Programmable menus direct a vendor through a series of questions requiring a response. These responses are made through the keys on the keypad. The variable data information is stored in the master computer (CPU, controller, or utility monitor). It is an object, feature and advantage of the present invention to solve the problem of interfacing multiple building related and information systems.

It is an object, feature and advantage of the present invention to simplify the installation of building related and information systems.

It is an object, feature and advantage of the present invention to solve the problems of prior art communication schemes for controls systems limited to physically wired connections.

It is an object, feature and advantage of the present invention to provide seamless integration of physically wired, independent building related and information systems.

It is an object, feature and advantage of the present invention to provide seamless integration of independent building related and information systems in through a single wireless configuration.

It is an object, feature and advantage of the present invention to provide seamless integration of independent building related and information systems in through multiple wireless configurations.

It is an object, feature and advantage of the present invention to provide seamless integration of non-compatible systems in a combination of physically wired and wireless configuration.

It is an object, feature and advantage of the present invention to provide compatibility to BacNet, LonWorks, and other open protocol communications with other building related or information systems.

It is an object, feature and advantage of the present invention to allow relocation of the satellite systems within the base system radio frequency propagation range.

It is an object, feature and advantage of the present invention to allow customized radio frequency propagation to accommodate site conditions.

It is an object, feature and advantage of the present invention to provide a repeatable microwave signal to extend system coverage.

It is an object, feature and advantage of the present invention to eliminate the physical connection of master to slave module digital interface communications.

It is an object, feature and advantage of the present invention to create a vendor tracking systems through physically wired connections.

It is an object, feature and advantage of the present invention to create a vendor tracking system through a wireless network.

It is an object, feature and advantage of the present invention to create a vendor tracking systems through a combination of physically wired connections and wireless network.

It is an object, feature and advantage of the present invention to allow multiple site utility aggregation through a wireless network.

It is an object, feature and advantage of the present invention to solve the problems of utility metering systems limited to physically wired connections.

It is an object, feature and advantage of the present invention to allow multiple site utility profiling to elicit improved aggregated utility rates through a wireless network.

These and other, more detailed, aspects of the invention will be apparent from and elucidated with reference to the drawings and embodiments described hereinafter.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 25 shows a preferred embodiment of the isynchronous remote communication of the wireless integrated building control and information system with wireless networking in accordance with the present invention.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
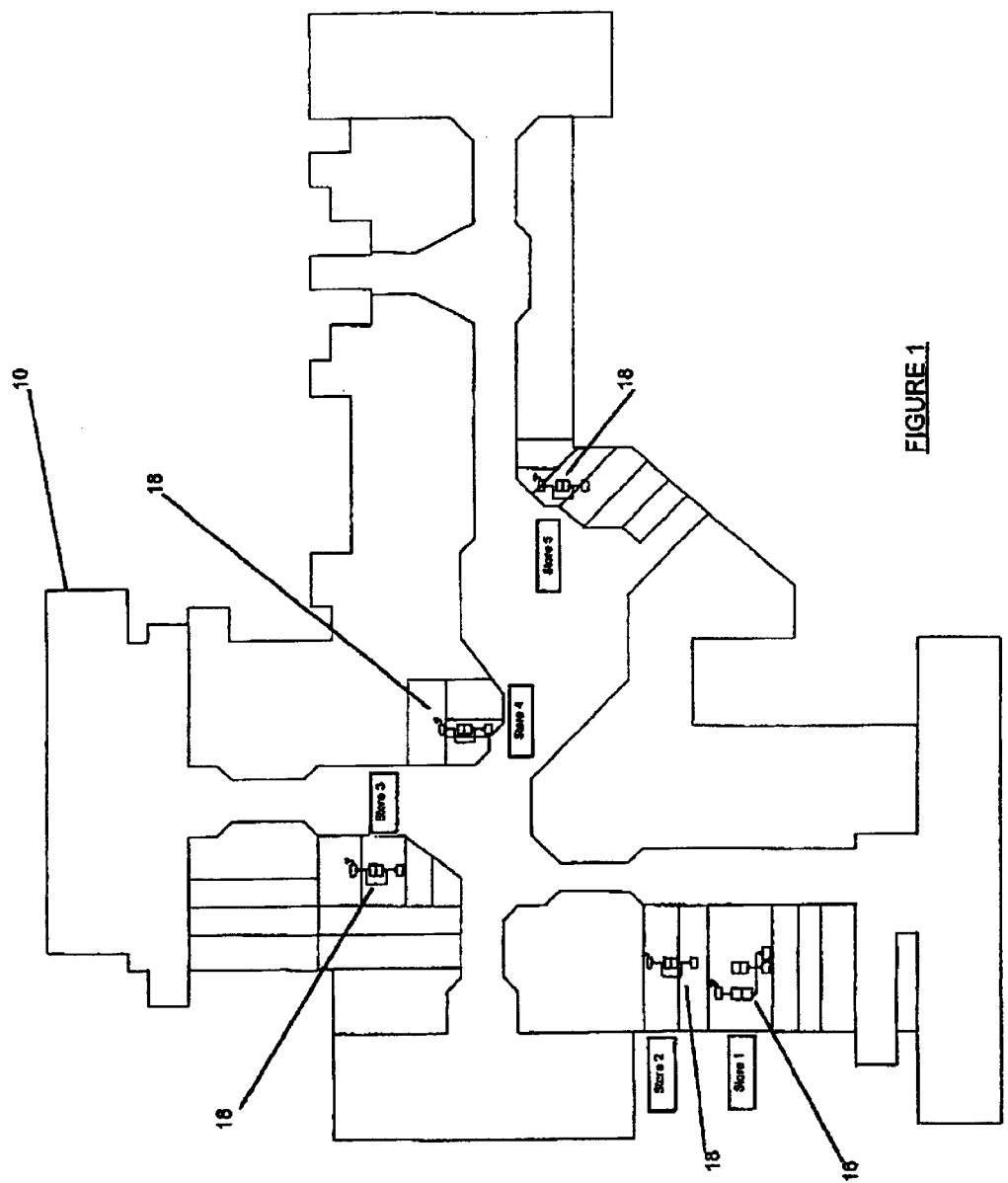
FIG. 1 diagrammatically shows an implementation (i.e., within a conventional shopping mall) of a preferred embodiment of an integrated building control and information system with wireless networking in accordance with the present invention.

The following presents a detailed description of a preferred embodiment of the present invention. As discussed above, the present invention relates to a wireless (or partially hard-wired) building control and information system (BCIS) with wireless networking having vendor tracking capability for use in a variety of commercial and/or industrial settings. For example, referring to FIG. 1, shown is a preferred implementation of this invention in a traditional shopping mall 10 wherein many retail stores having at least one RF satellite network 18 can be controlled and/or monitored from one master control location having one RF master network 16.

More specifically, this invention relates to a wireless BCIS which controls the air conditioning, lighting, temperature, humidity, etc.—practically any environmental condition or mechanical operation can be controlled and/or monitored through the appropriate interface or sensor with this invention. Additionally, the wireless BCIS incorporates a vendor tracking system (VTS) comprising an industrial operator interface terminal (i.e., essentially a keypad and display screen) with some data processing and storage capabilities. This operator interface allows programmable menus to direct a vendor through a series of questions and/or statements, some of which prompt a response. The response is made through a designated key on the keypad, which is then embedded as a variable. This variable is then stored in a database, and the computer is polled or programmed to contact a remote location, to transmit this data.

System Overview

Figure 2A:
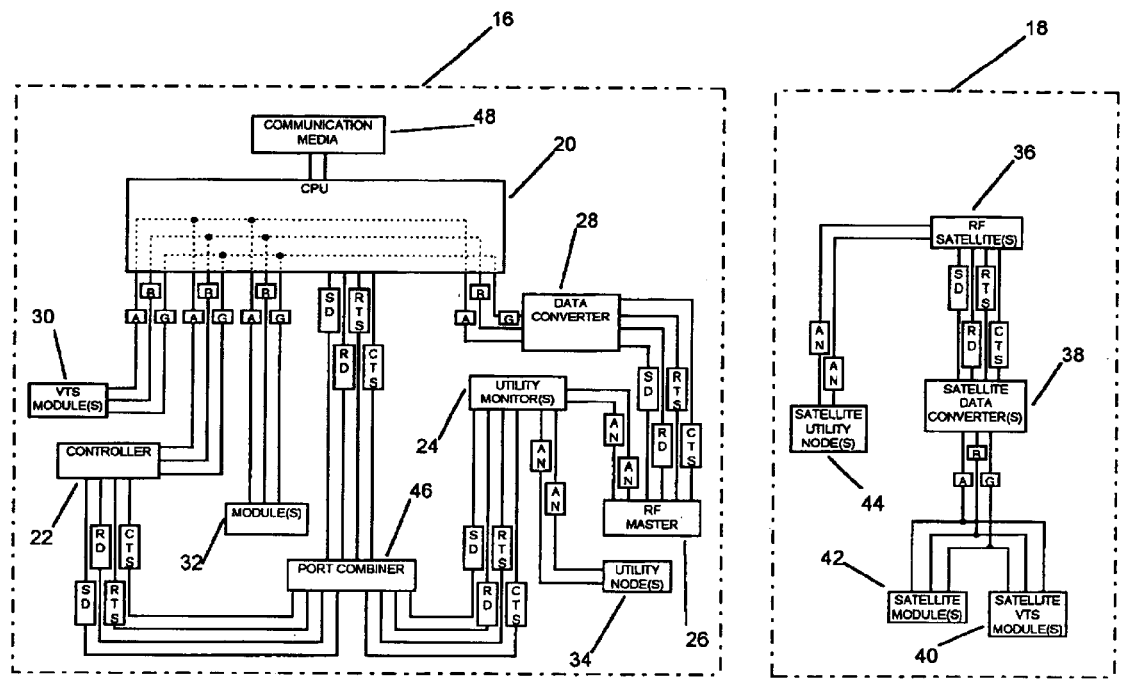
FIG. 2A shows a schematic representation of the system architecture of a preferred embodiment of an integrated building control and information system with RF satellite network(s), in accordance with the present invention.
Figure 2B:
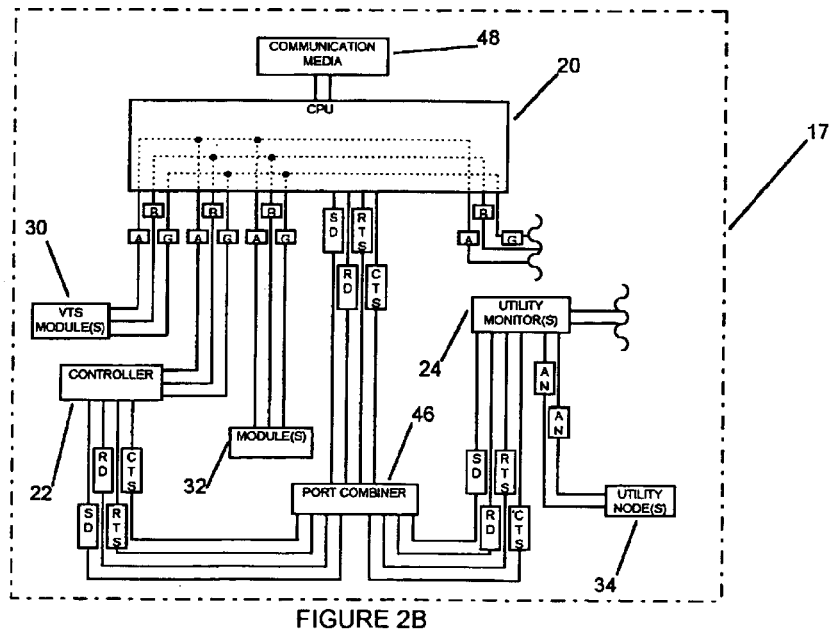
FIG. 2B shows a schematic representation of the system architecture of a preferred embodiment of an integrated building control and information system without RF satellite network(s), in accordance with the present invention.
Figure 6A:
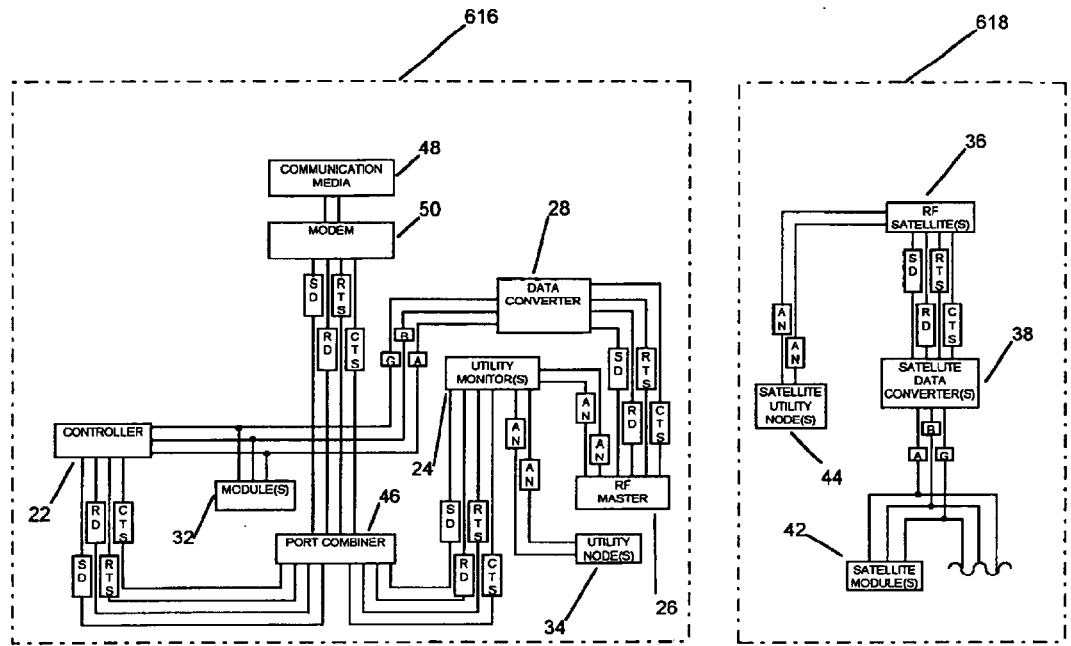
FIG. 6A shows a schematic representation of the system architecture of a preferred embodiment of a system in accordance with the present invention including only the controller sub-system and the utility sub-system only, with the RF satellite network(s), as shown in FIG. 2A.
Figure 6B:
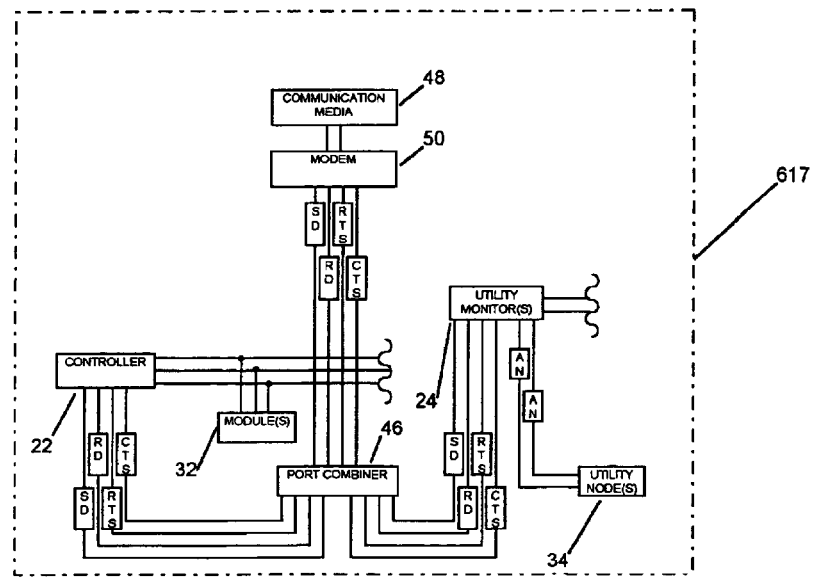
FIG. 6B shows a schematic representation of the system architecture of a preferred embodiment of a system in accordance with the present invention including only the controller sub-system and the utility sub-system only, without the RF satellite network(s), as shown in FIG. 2B.
Figure 6C:
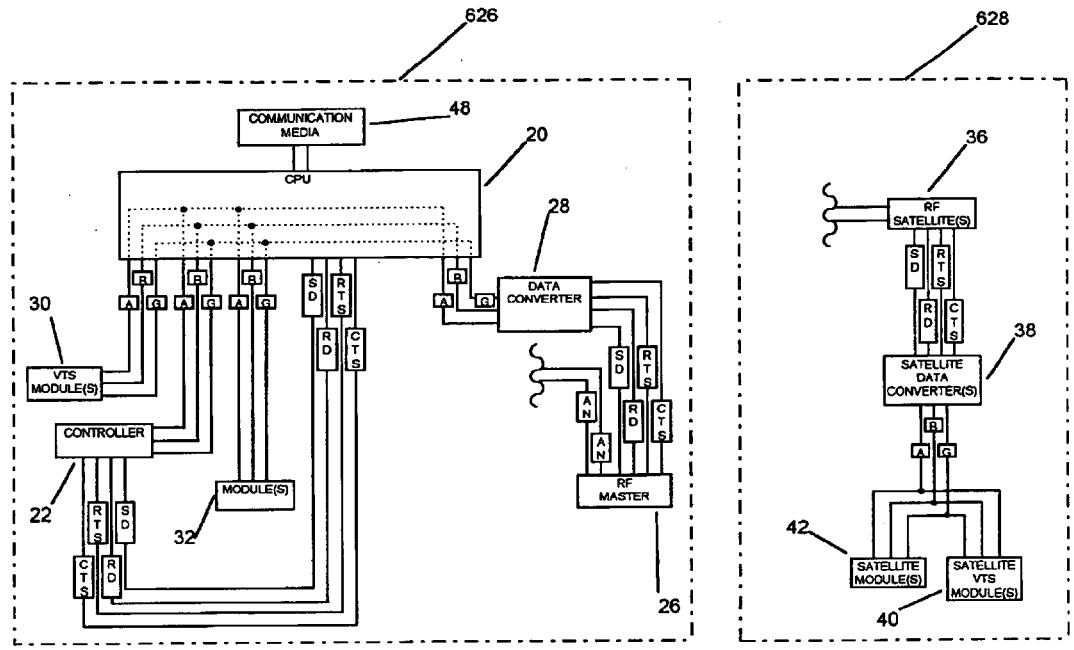
FIG. 6C shows a schematic representation of the system architecture of a preferred embodiment of a system in accordance with the present invention including only the controller sub-system and the VTS sub-system, with the RF satellite network(s), as shown in FIG. 2A.
Figure 6D:
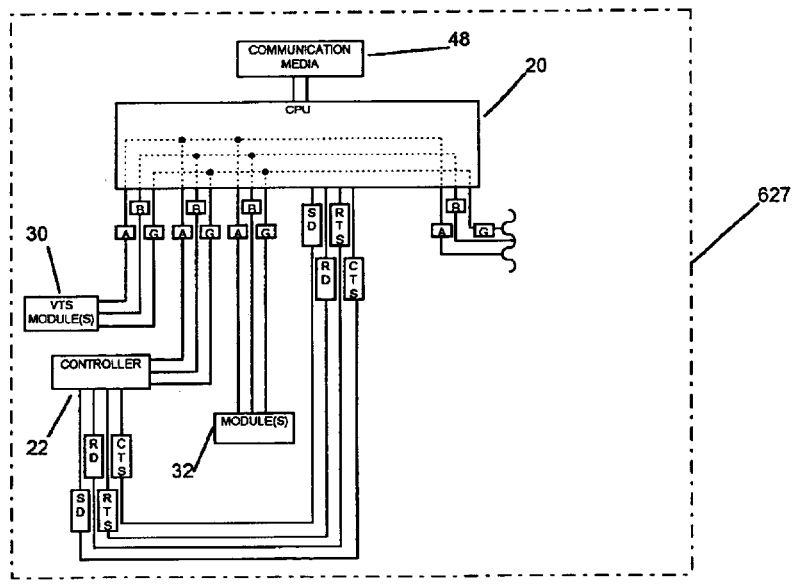
FIG. 6D shows a schematic representation of the system architecture of a preferred embodiment of a system in accordance with the present invention including only the controller sub-system and the VTS sub-system, without the RF satellite network(s), as shown in FIG. 2B.
Figure 6E:
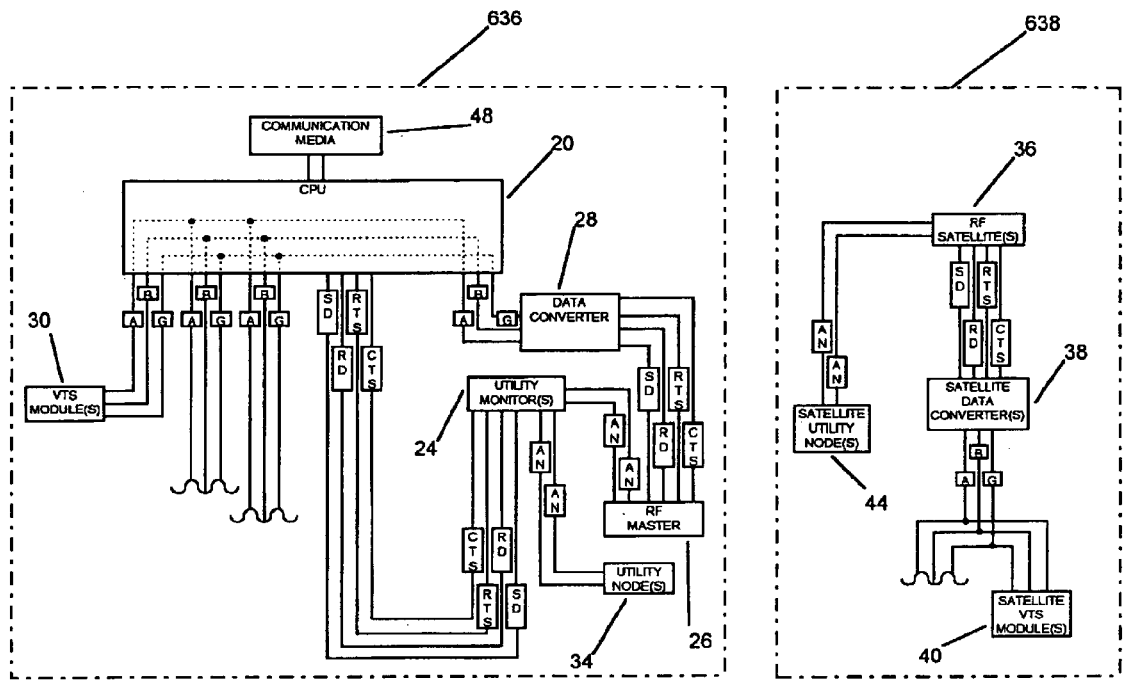
FIG. 6E shows a schematic representation of the system architecture of a preferred embodiment of a system in accordance with the present invention including only the VTS sub-system and the utility sub-system, with the RF satellite network(s), as shown in FIG. 2A.
Figure 6F:
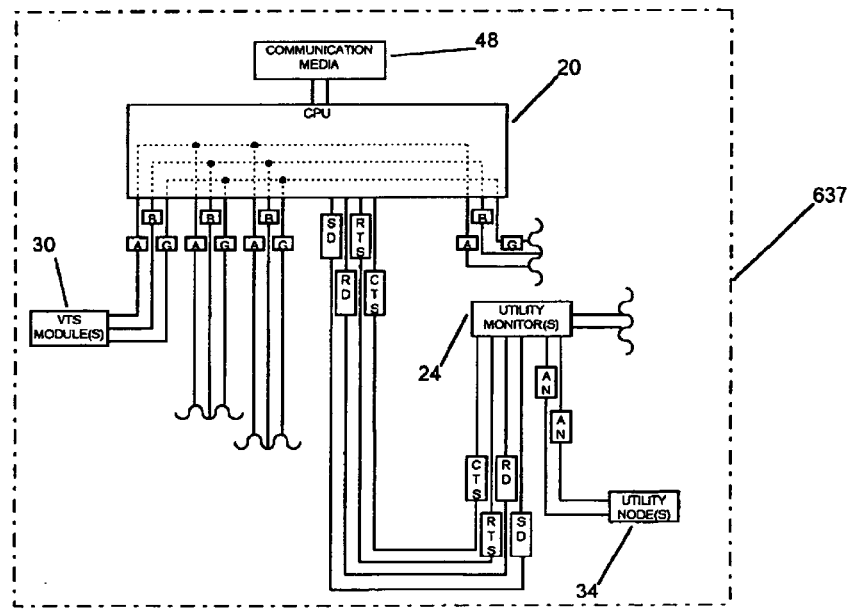
FIG. 6F shows a schematic representation of the system architecture of a preferred embodiment of a system in accordance with the present invention including only the VTS sub-system and the utility sub-system, without the RF satellite network(s), as shown in FIG. 2B.

According to a preferred embodiment of the present invention, the wireless BCIS shown in FIGS. 2A & 2B comprises several sub-systems, each of which is depicted in FIGS. 3–6. First, there is the vendor tracking sub-system, which is shown in FIGS. 3A & 3B in two different embodiments. FIG. 3A is vendor tracking sub-system 317 without an RF satellite network (hereinafter "VTS sub-system"). FIG. 3B is vendor tracking sub-system 316 with RF satellite network 318 (hereinafter "VTS-RF sub-system"). Second, there is the controller sub-system, which is shown in FIGS. 4A & 4B in two different embodiments. FIG. 4A is controller sub-system 417 without an RF satellite network (hereinafter "controller sub-system"). FIG. 4B is controller sub-system 416 with RF satellite network 418 (hereinafter "controller-RF sub-system"). Third, there is the utility monitoring sub-system, which is shown in FIGS. 5A & 5B in two different embodiments. FIG. 5A is utility monitoring sub-system 517 without an RF satellite network (hereinafter "utility sub-system"). FIG. 5B is utility monitoring sub-system 516 with RF satellite network 518 (hereinafter "utility-RF sub-system"). Finally, there are six alternate "stand-alone" sub-systems, shown in FIGS. 6A–6F, wherein alternate embodiments of the present invention are described. These are as follows:

FIG. 6A is an integrated building control and information system with wireless networking including controller-RF sub-system and utility-RF sub-system, but not VTS-RF sub-system;

FIG. 6B is an integrated building control and information system without wireless networking including both controller sub-system and utility sub-system, but not VTS sub-system;

FIG. 6C is an integrated building control and information system with wireless networking including controller-RF sub-system and VTS-RF sub-system, but not utility-RF sub-system;

FIG. 6D is an integrated building control and information system without wireless networking including both controller sub-system and VTS sub-system, but not utility sub-system;

FIG. 6E is an integrated building control and information system with wireless networking including VTS-RF sub-system and utility-RF sub-system, but not controller-RF sub-system; and FIG. 6F is an integrated building control and information system without wireless networking including both VTS sub-system and utility sub-system, but not controller sub-system.

In embodiments A and B briefly described above, controller 22 functions as the administrator of the communications, rather than the CPU, while in embodiments C, D, E and F briefly described above, the CPU is the administrator of the communications with the system. All of these sub-systems are described in greater detail below.

Beginning with the CPU, both firmware and software are incorporated therein to perform the function as the administrator of the communications and the VTS. The use of standard "AT bus" and component architecture within CPU 20 allows for the use of future firmware enhancement in computer technology. In the preferred embodiment of the present invention (FIG. 2A), CPU 20 serves as a single point of remote communication for all of the sub-systems within the present invention, and it monitors the activity of, and communicates through, the RS-485 wireless sub-network.

Additionally, each of the controller-RF, controller, utility-RF, utility, VTS-RF and VTS sub-systems are capable of operating independently of each other. For example, both the controller-RF, and controller sub-systems' processing and module communication is operable without any CPU intervention. The utility-RF and utility sub-systems are similarly independent. However, although VTS-RF and VTS sub-systems are dependent upon CPU 20 as its main processor or master, it is operable without the controller-RF, controller, utility-RF and utility sub-systems.

With respect to the VTS, CPU 20 initiates all VTS module communication, disseminates all VTS data, and supports VTS remote communication. Also, each sub-system is fully operable in a local, hard-wired mode, i.e., without any wireless radio frequency (RF) communication (see FIGS. 2B, 3A, 4A, 5A and 6B, D & F).

In accordance with the present invention, the wireless communication is performed by a RF communication system. This system comprises RF master device (RF master) 26 and RF satellite device (RF satellite) 36. This wireless RF communication of the multiple sub-systems is functionally transparent to all of the other system devices—that is, the other system devices function as if the entire system was hard-wired rather than wireless.

With respect to the wireless communications, RF master 26 coordinates all logistical functions of RF satellite network(s) 18. Maintaining sub-system independence, RF satellite network(s) 18 can function without any intervention from CPU 20. Consequently, RF satellite network(s) 18 are capable of supporting the controller-RF sub-system and/or the utility-RF sub-system in stand-alone modes.

In a preferred embodiment of the present invention, each of RF satellite network(s) 18 requires RF master 26 operation for communications with satellite module(s) 42, VTS module(s) 40, and utility node(s) 44, respectively. The RF satellite network(s) 18 communicate through RF master 26 only. Therefore, each operating satellite network is unaffected by the addition or removal of any other RF satellite network.

Unlike hard-wired RS-485 networks, each wireless network, RF master 26 or RF satellite 36, is capable of supporting up to 32 nodes. Currently, the maximum cable length of the hard-wired networks is 4000 feet for each locale—anything longer will not function. However, the use of high power output transceivers and/or repeaters can extend the maximum cable length, as well as the module capacity, typically up to 128 nodes. Similarly, in accordance with the present invention, the total number of modules per RF master 26 or RF satellite network(s) 18 hard wired can be expanded by the same technology, thereby increasing the total number of modules supported by any given sub-system.

System Embodiments

Turning now to FIG. 2A, shown is the overall system architecture of a preferred embodiment of the present invention. Specifically, shown are RF master control network 16 and RF satellite network 18 (the BCIS system according to the present invention can handle an unlimited number of RF satellite networks 18). First, within RF master control network 16, there are several components which comprise the multiple sub-systems mentioned above (i.e., controller-RF, controller, VTS-RF, VTS, utility-RF and utility sub-systems). These components are as follows: communication media 48; CPU 20; VTS module(s) 30; controller 22; module(s) 32; port combiner 46; utility monitor 24; utility node(s) 34; data converter 28; and RF master 26—all of which are hard-wired together within the master control location of the BCIS.

Second, within RF satellite network 18, there are several components which comprise each of these network(s), depending upon how many sub-systems exist in the BCIS (i.e., controller-RF, controller, VTS-RF, VTS, utility-RF and utility sub-systems). In a system having the previously mentioned sub-systems, the components of RF satellite network(s) 18 are as follows: RF satellite 36; VTS satellite module(s) 40; satellite module(s) 42; satellite utility node(s) 44; and satellite data converter 38—all of which are hard-wired together within each RF satellite network 18. This hardware (RF master control network 16 and RF satellite network 18) comprises one preferred embodiment of the wireless BCIS communication network in accordance with this invention.

Shown in FIG. 2B, on the other hand, is the system architecture for an alternate embodiment of the present invention. Specifically, shown is master control network 17 in a stand-alone mode (i.e., no RF communication network 18). Here, too, master control network 17 comprises several components that form the multiple sub-systems mentioned above. These components are: communication media 48; CPU 20; VTS module(s) 30; controller 22; module(s) 32; port combiner 46; utility monitor 24; and utility node(s) 34—all of which are hard-wired together within the master control location of the BCIS. This embodiment of the present invention is, however, limited to the conventional, EIA, RS-485 network architecture limitations.

Figure 3A:
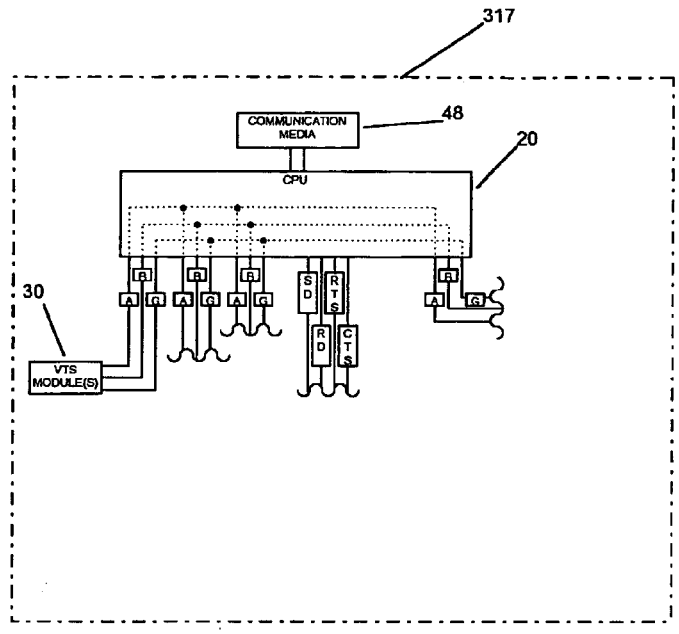
FIG. 3A shows a schematic representation of the system architecture of a preferred embodiment of a vendor tracking system (VTS) without the RF satellite network(s), as shown in FIG. 2B, in accordance with the present invention.

Referring next to FIG. 3A, shown is an alternate embodiment of the present invention comprising VTS sub-system 317 without an associated RF satellite network 18, which can function as a stand-alone system. This embodiment, in a stand-alone mode, reduces the overall system architecture of FIG. 2A by removing both controller sub-system 417 and utility sub-system 517. Application of the system according to this embodiment, however, is limited to conventional, EIA, RS-485 network architecture (i.e., hard-wired). The components required for this embodiment is as follows: communication media 48; CPU 20; and VTS module(s) 30.

Figure 3B:
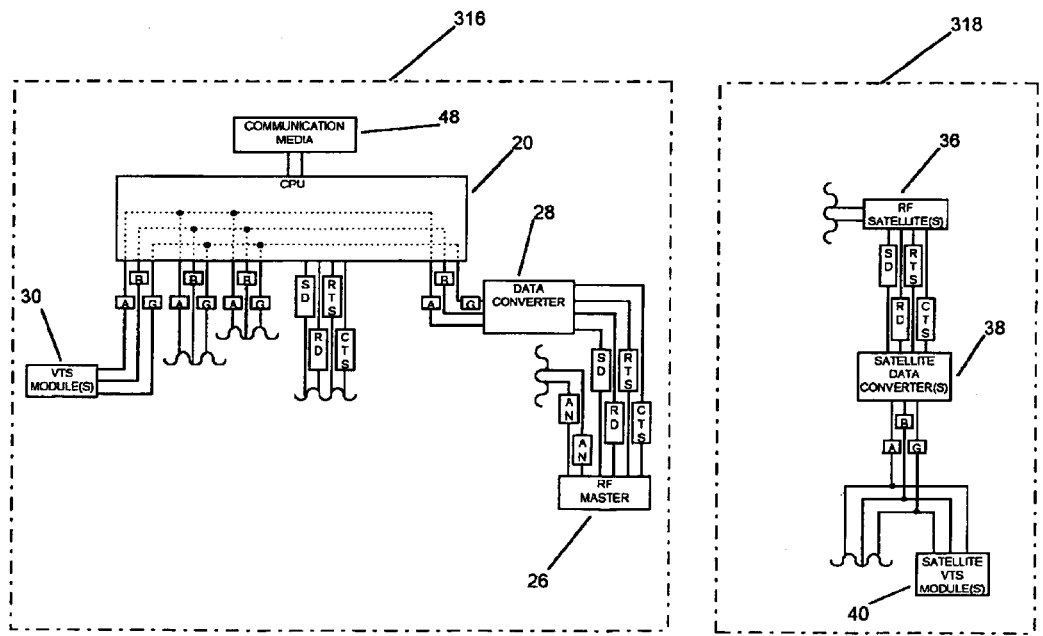
FIG. 3B shows a schematic representation of the system architecture of a preferred embodiment of a wireless VTS with the RF satellite network(s), as shown in FIG. 2A, in accordance with the present invention.

Next, shown in FIG. 3B is, according to another alternate embodiment of the present invention, VTS-RF sub-system with an associated RF satellite network 18. As with the VTS sub-system of FIG. 3A, the VTS-RF sub-system of FIG. 3B can also operate in a stand-alone mode. Again, this embodiment reduces the overall system architecture of FIG. 2 by removing both controller-RF and utility-RF sub-systems. Application of the system according to this embodiment, however, is not entirely limited to conventional, EIA, RS-485 network architecture (i.e., hard-wired) because of associated RF satellite network(s) 18. In addition to communication media 48, CPU 20, and VTS module(s) 30, this embodiment requires the following components: data converter 28; RF master 26; RF satellite 36; satellite data converter 38; and VTS satellite module(s) 40.

Figure 4A:
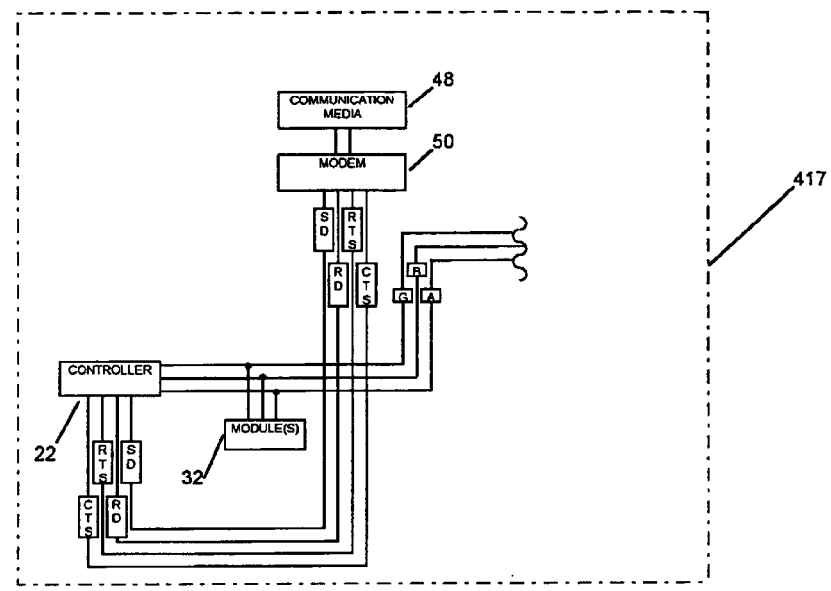
FIG. 4A shows a schematic representation of the system architecture of a preferred embodiment of the controller sub-system without the RF satellite network(s), as shown in FIG. 2B, in accordance with the present invention.

Turning now to FIG. 4A, shown is an existing building management control system (e.g., a system manufactured by Novar). This existing system comprises a controller sub-system without an associated RF communication network (i.e., there is no RF master control 26 nor RF satellite network 18). This sub-system is operable as a stand-alone system, but would be limited to one locale or a few very close locales because of conventional, EIA, RS-485 network architecture limitations. The present invention is an enhancement of this system in that its provides both a VTS sub-system (which has never been done before) and an associated RF communication network (never used this way before), thereby eliminating the conventional, EIA, RS-485 network architecture limitations.

Figure 4B:
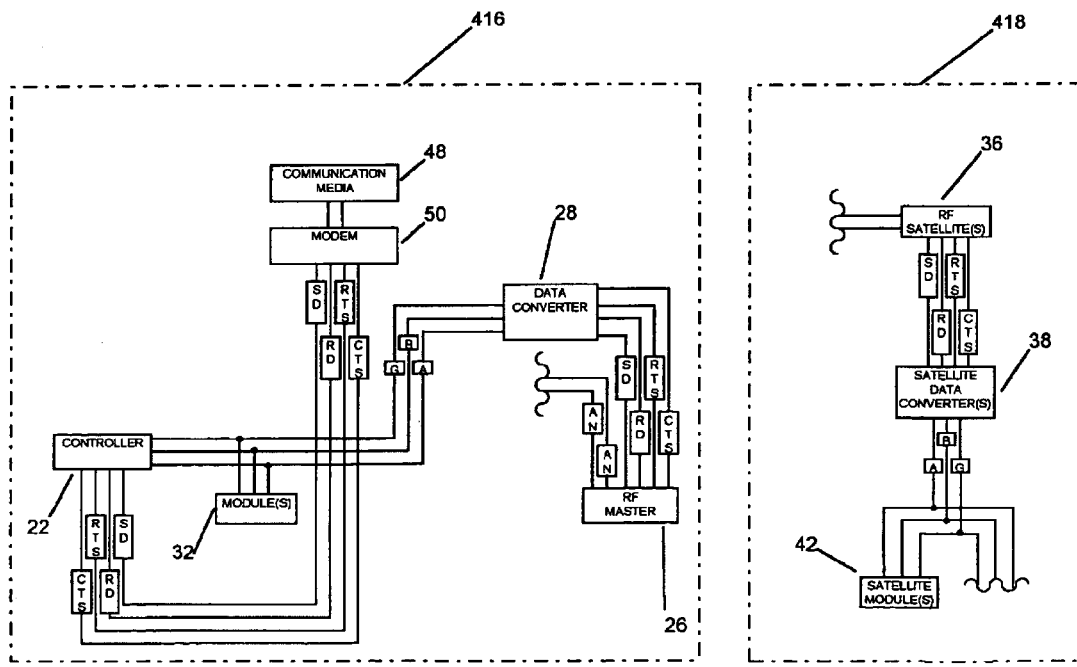
FIG. 4B shows a schematic representation of the system architecture of a preferred embodiment of the wireless controller sub-system with the RF satellite network(s), as shown in FIG. 2A, in accordance with the present invention.

Alternatively, as shown in FIG. 4B, an embodiment of the present invention comprises controller-RF sub-system with an associated RF satellite network 18. Again, this controller-RF sub-system can function as a stand-alone system, but without being limited to conventional, EIA, RS-485 network architecture limitations. In a stand-alone mode, this embodiment reduces the overall system architecture of FIG. 2A by removing both VTS-RF and utility-RF sub-systems. As stated above, application of the system according to this embodiment, is not limited to conventional, EIA, RS-485 network architecture, but rather, it is only limited by any limitation of the RF communication network.

In addition to the components shown in FIG. 4A and listed above (including optional components), this controller-RF sub-system embodiment requires RF master 26 and data converter 28 in RF master control network 16 and at least one RF satellite network 18, including (but not limited to) RF satellite(s) 36, satellite data converter(s) 38, and satellite module(s) 42. Further, as with any of the sub-systems operable in stand-alone mode, a system of this embodiment can be combined with any other sub-system (i.e., VTS-RF sub-system, utility-RF sub-system, etc.) to form an enhanced BCIS communication facility. With respect to communication media 48, in addition to having a direct connection, according to the present invention, communication can also occur by remote communication (e.g., via phone line) directly with controller 22. Note, however, that when also including utility-RF sub-system (described below and shown in FIGS. 6A & 6B) one media can only be used if port combiner 46 (along with a modem) is also used—utility monitor 24 and controller 22 require independent medias. Otherwise, two forms of communication media are necessary, one for controller 22 (or CPU 20) and one for utility monitor 24.

As yet another alternative embodiment, the system of the present invention, either with or without associated RF satellite network 18 and not including VTS or VTS-RF sub-systems can be further limited by removing CPU 20. This embodiment will function the same as described above in the text corresponding to FIGS. 4A & 4B—the only difference being that controller 22 assumes all of the administrator functions of CPU 20. With respect to communication media 48, in addition to having a direct connection, this can also operate by remote communication (e.g., via phone line) directly with controller 22. Note again, however, that when either a utility sub-system or a utility-RF sub-systems (described below and shown in FIGS. 5A & 5B) is included, one media can be used only if port combiner 46 (along with a modem) is also used—port combiner 46 is described in greater detail below. Otherwise, two forms of communication media are necessary, one for controller 22 data (or CPU 20 data) and one for utility monitor 24 data.

Figure 5B:
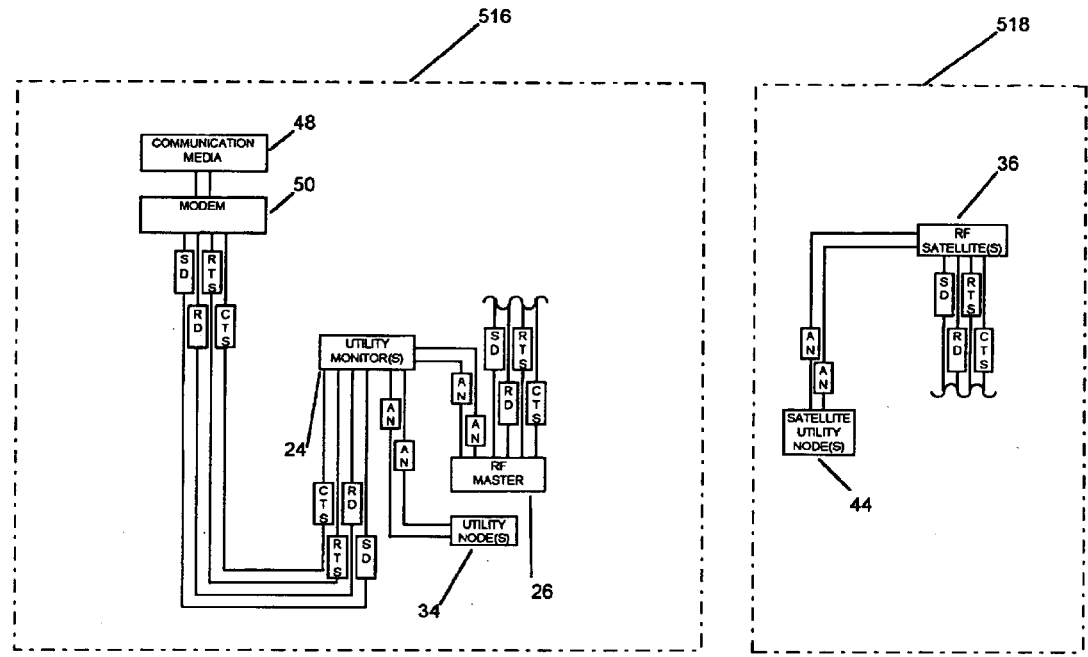
FIG. 5B shows a schematic representation of the system architecture of a preferred embodiment of a UMS with the RF satellite network(s), as shown in FIG. 2A, in accordance with the present invention.
Figure 5A:
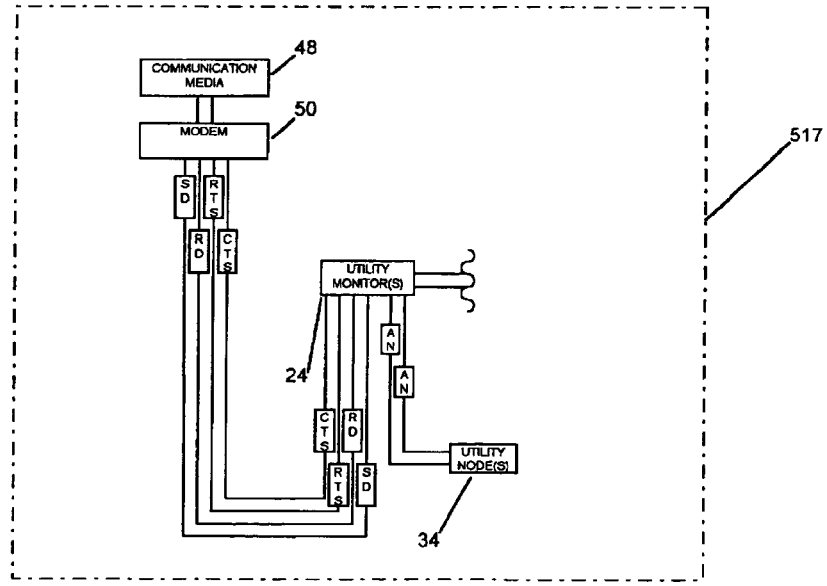
FIG. 5A shows a schematic representation of the system architecture of a preferred embodiment of a utility monitoring system (UMS) without the RF satellite network(s), as shown in FIG. 2B, in accordance with the present invention.

Turning now to FIG. 5A, shown is an existing utility monitoring/control system (i.e., a system manufactured by Interlane). The embodiment of this existing system merely comprises a utility sub-system having utility monitor 24 and at least one utility node 34, but not having an associated RF communication network (i.e., RF master control 16 and RF satellite network 18). This sub-system is operable as a stand-alone system, but would be limited to one locale (or a few very close locales) because of conventional wiring limitations for analog circuits. The present invention is an enhancement of this system in that it provides the addition of RF communication network, thereby eliminating the conventional wiring limitations for analog circuits.

Referring next to FIG. 5B, shown is the alternate embodiment of the present invention comprising a utility-RF sub-system having an associated RF satellite network 18. In this embodiment, the utility-RF sub-system can function as a stand-alone system, but is no longer limited to conventional wiring limitations for analog circuits. In a stand-alone mode, this embodiment reduces the overall system architecture of FIG. 2A by not having a VTS-RF sub-system, CPU 20 or controller-RF sub-system—although any of these sub-systems/components can be added to enhance the overall system based on the needs of the end user. As stated above, application of the system according to this embodiment, is not limited to conventional wiring limitations for analog circuits, but rather, is only limited by any RF communication network limitations. In addition to the components shown in FIG. 5A, this embodiment requires RF Master 26 in master control network 16 and at least one RF satellite network 18, including (but not limited to) RF satellite(s) 36 and utility node(s) 42—satellite module(s) 42 and satellite VTS modules 40 may be included so long as their corresponding sub-systems are also present. With respect to communication media 48, in addition to having a direct connection, this can also operate by remote communication (e.g., via phone line) directly with utility monitor 24. Note, however, that when also including a controller or controller-RF sub-system (described above and shown in FIGS. 4A & 4B) one media can only be used if port combiner 46 (along with a modem) is also used. Otherwise, two forms of communication media are necessary, one for controller 22 data (or CPU 20 data) and one for utility monitor 24 data.

CPU Architecture

Figure 17:
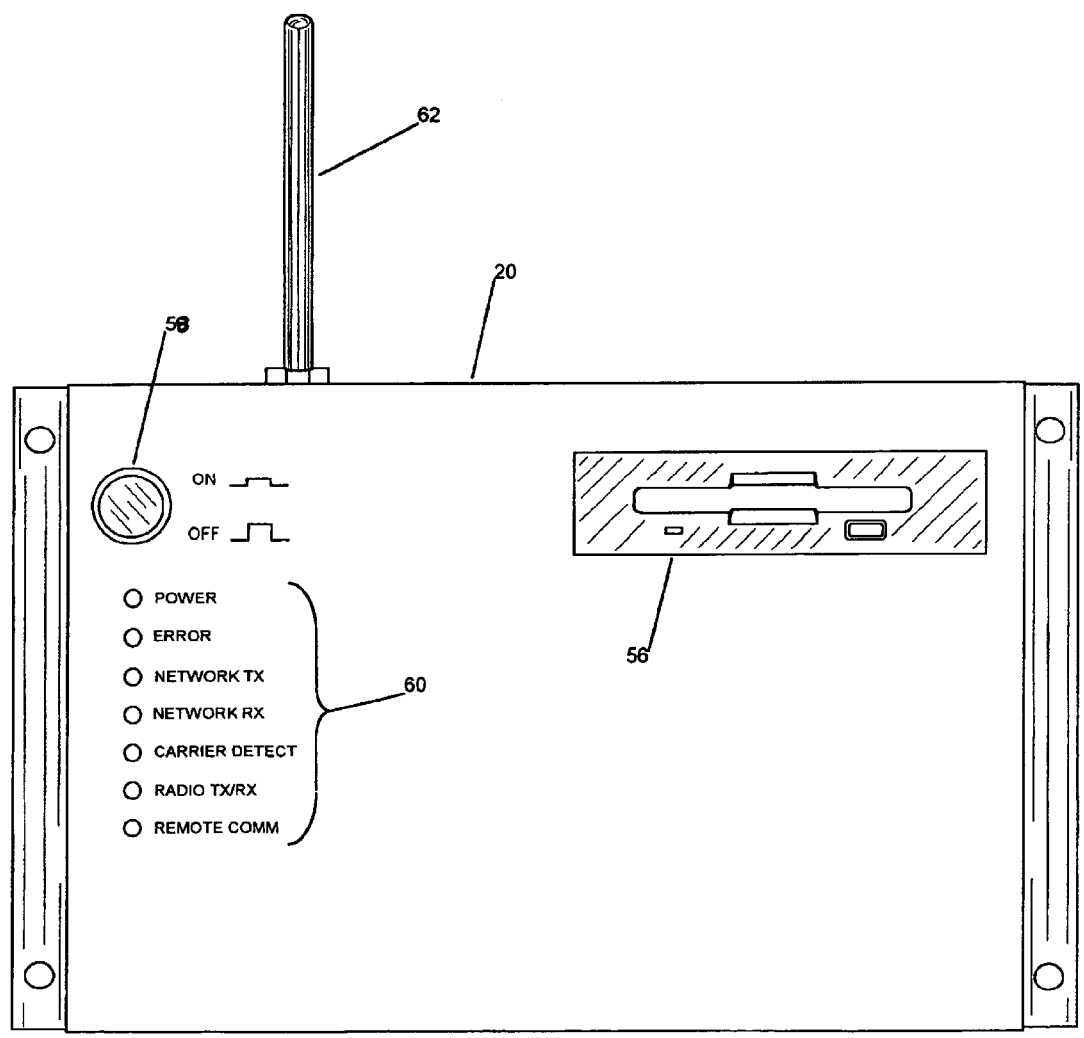
FIG. 17 shows a preferred embodiment of the face of the CPU device in accordance with the present invention.
Figure 18A:
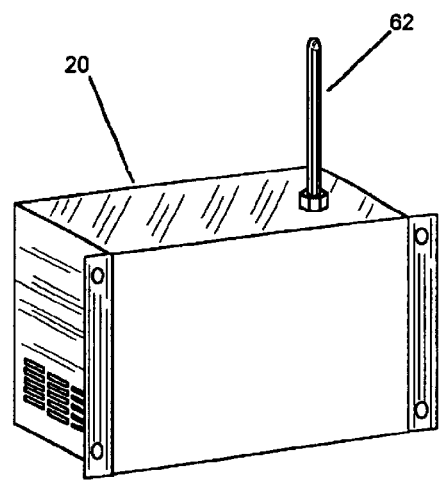
FIG. 18A shows a perspective view of a preferred embodiment of the CPU device (showing its top, right and back), in accordance with the present invention.
Figure 18B:
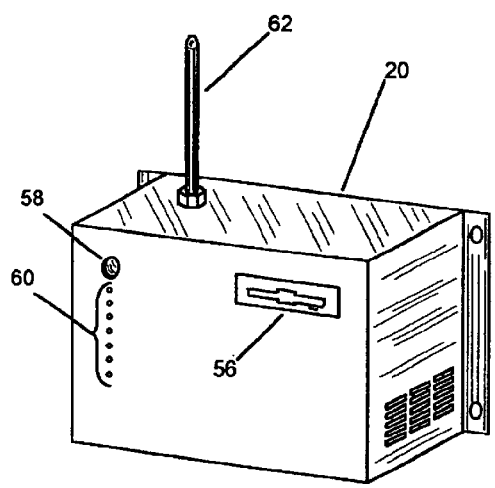
FIG. 18B shows a perspective view of a preferred embodiment of the CPU device (showing its top, right and front), in accordance with the present invention.
Figure 18C:
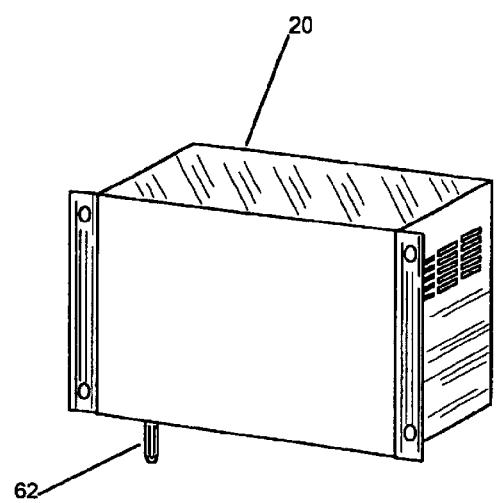
FIG. 18C shows a perspective view of a preferred embodiment of the CPU device (showing its bottom, right and back), in accordance with the present invention.
Figure 19:
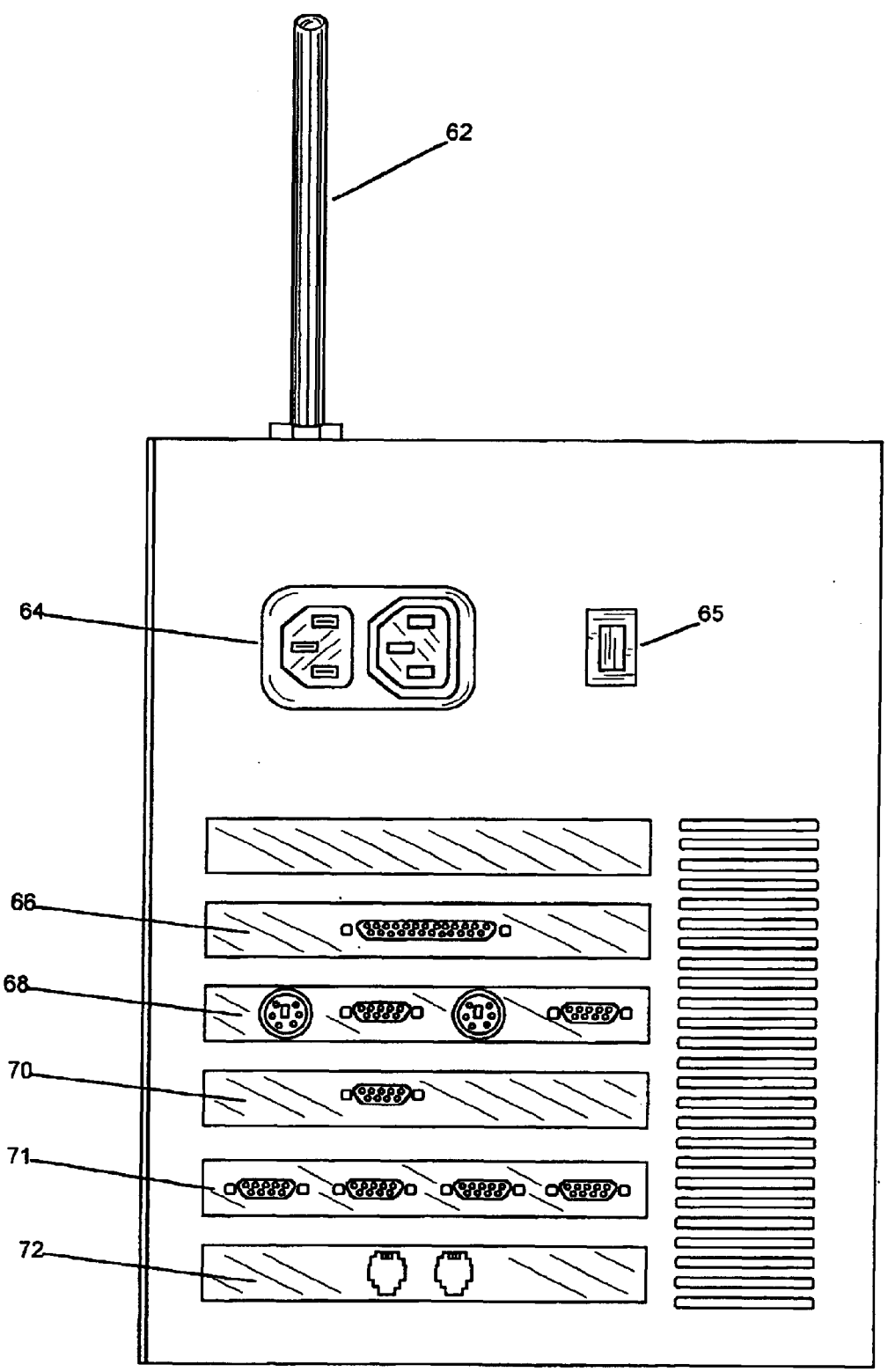
FIG. 19 shows a preferred embodiment of the left side of the CPU device (showing all of its input/output ports) in accordance with the present invention.

Referring next to FIGS. 17–19, shown is the exterior enclosure of an embodiment of CPU 20. As shown, CPU 20 comprises floppy disk drive 56, power switch 58, external antenna 62 and several indicators (power, error, network TX, network RX, carrier detect, radio TX/RX, remote COMM) 60—additional indicators are optional. Also, CPU 20 has several external connector ports, as shown in FIG. 19, which are located on one of the sides of CPU 20 (alternatively, they could be located on the backplane of CPU 20). These connector ports include, but are not limited to:

1) power connector 64;
2) communication media input/output ports 72 (i.e., modem/telephone line);
3) DB9 RS-232, RS-422 and RS-485 four (4) port card 71 having four (4) DB9 serial ports (e.g., manufactured by B & B Electronics);
4) video driver port 70;
5) conventional 25-pin parallel port 66;
6) circuit breaker 65; and
7) keyboard/DB9 serial connector card 68 having two (2) DB9 serial ports and two (2) circular DIN connectors.

Also, included within CPU 20, but not shown in any figure, is an internal power supply with a cooling fan. Other conventional components may also be included, but are not mentioned here because they are conventional to the operation of CPU 20 and it is obvious that they would be included.

Figure 20:
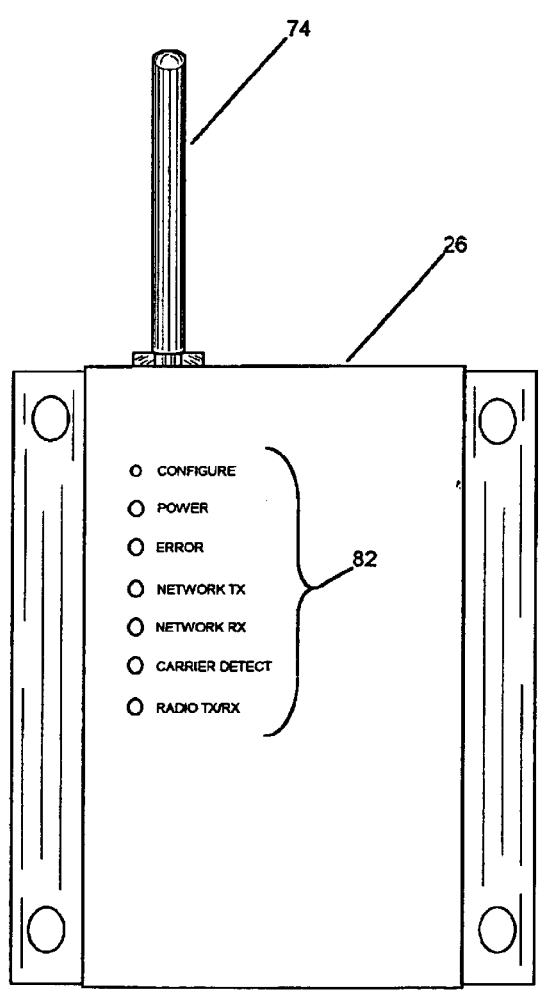
FIG. 20 shows a preferred embodiment of the face of the RF device (either master or satellite) in accordance with the present invention.

Additionally, components internal to CPU 20, but not depicted in any of FIGS. 18–20, include, but are not limited to, the following:

1) internal RF master 26 (note also that RF master 26 may be housed externally (i.e., outside the enclosure of CPU 20), in its own enclosure (see FIGS. 20–22 and their associated text for a more detailed description));
2) digital to analog converter (DAC) 28;
3) bridging circuit;
4) Port combiner 46;
5) Video driver card;
6) digital conversion circuitry;
7) remote antenna; and
8) remote communication card.

First, an internal RF master 26 for use with this invention may be one of the type manufactured by Nomadic Technologies. The function of the internal RF master 26 is to provide wireless RF communication with the RF satellite network(s) 18. To accomplish this, internal RF master 26 is connected to external antenna 62 which transmits and receives RF signals between the RF master 26 and the RF satellite network(s) 18.

Alternatively, in another embodiment of the present invention, an external RF master control may be used which allows removed or distant, hard-wired mounting of the RF master control from CPU 20. This embodiment reduces the architecture of CPU 20 by removing the internal RF master card 26 and all of the indicators except, of course, the power indicator. Also, this embodiment facilitates use of an RF communication network in a stand-alone mode or in any combination referenced herein which does not include CPU 20.

Figure 12:
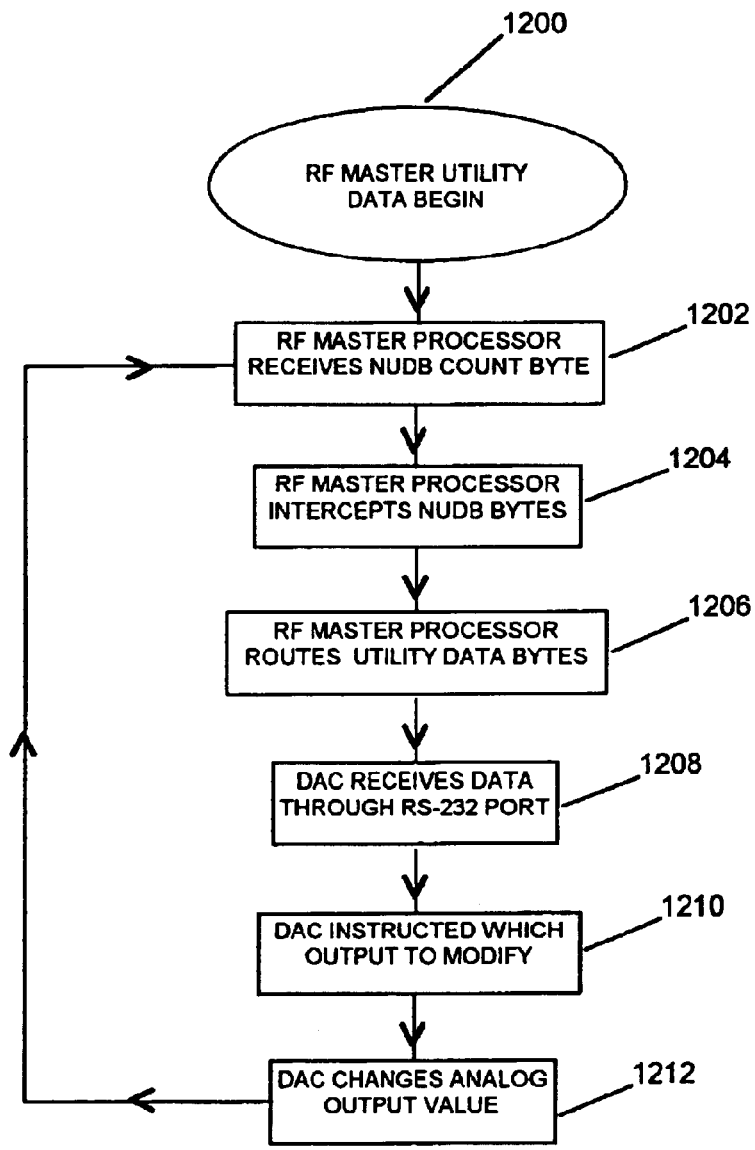
FIG. 12 is a block diagram showing a preferred embodiment of RF master utility data operations in accordance with the present invention.

The digital to analog converter (DAC) used with the RF communication network is designed to perform the logical functions to change the state of the selected output point from analog to a voltage, milliamp, or digital response (see FIG. 12 block (1212) and the text associated therewith).

Additional components include port combiner 46, a video driver card, a transistor to transistor circuit and an enclosure mounted antenna. More specifically, an embodiment of port combiner 46 for use with the system of the present invention is an integrated RS-232 port combiner manufactured by B & B Electronics. An example of a video driver card for use with this invention is one manufactured by Oak Technologies.

The bridging circuit used in a preferred embodiment of the present invention is a unique fail-safe feature of CPU 20. It consists of a photovoltaic MOSFET relay integrated circuit (PMIC) (e.g., one manufactured by International Rectifier), which is applied between two (2) DB9 ports (used for the RS-485 network) of four (4) port card 71. The PMIC operates as a normally closed solid state relay which is controlled by CPU 20. Upon successful start up completion of CPU 20, the PMIC is opened to allow the software functions, as described herein, to occur. In the event that CPU 20 fails to operate properly, power is removed from CPU 20 (or CPU 20 is otherwise disabled) and the PMIC reverts to its normal closed state. This enables controller or controller-RF sub-system to continue its normal operation. Also, this bridging circuit is applied between RS-232 DB9 ports 7 and 8.

The digital conversion circuitry is applied to the respective RS-485 network(s) for both conversion and data flow control. For a more detailed account of the digital conversion circuitry, see the description below associated with FIGS. 23 and 24.

Enclosure mounted antenna (e.g., manufactured by Nomadic Technologies), or remote antenna (e.g., manufactured by Connectronics) includes any well known, tuneable antenna for use with the transmission of radio signals.

The remote communication card provided may support alternate communication media. Such alternate media may include local area networks, wide area networks, fiber optics, satellite, and wireless radio modems. Another embodiment comprises remote communication only. This embodiment reduces the architecture of CPU 20 by removing video driver card 70 and keyboard/mouse/mouse/DB9 serial connector card 68. Local connection and communication, however, will require interface with the remote communication card.

In a local-communication-only embodiment, the architecture of CPU 20 is reduced by removing the remote communication card described above. All system communications are then accomplished through the RS-232 ports.

In both the internal and external RF master 26 embodiments described above, remote antenna positioning is an alternative to the local antenna configuration previously described. This configuration enables customized radio frequency propagation based on the site(s) requirements.

CPU Operation

In operation, CPU 20 serves as the administrator of all communications within the BCIS according to the present invention. First, start-up of CPU 20 can occur via one of several methods:

1) applying power to CPU 20 via power connector 64;
2) manually resetting CPU 20 via the keyboard interface;
3) manually resetting CPU 20 by mechanically removing the power to only CPU 20; or
4) a forced resetting of CPU 20 by the monitoring circuit which removes the processor power if processing activity ceases for a defined time period (which can be set by the user).

Upon start-up of CPU 20, the operating system is initialized thereby enabling the CPU components and network support software. Then, CPU 20 breaks the RS-485 bridging circuit (described above in greater detail). As described above, the bridging circuit serves as a default communication path to continue RS-485 communication if CPU 20 is powered down or otherwise rendered inoperative. It is important to note that alternate embodiments exist whereby CPU 20 is not needed. For example, in any embodiment which does not include a VTS or VTS-RF sub-system, CPU 20 is not needed because either controller 22 or utility monitor 24 could assume the administrator of communications functions which CPU 20 would otherwise control. However, VTS and VTS-RF sub-systems do require CPU 20 because neither controller 22 nor utility monitor 24 can operate the vendor tracking functions in accordance with the present invention.

Remote Communication

Figure 7:
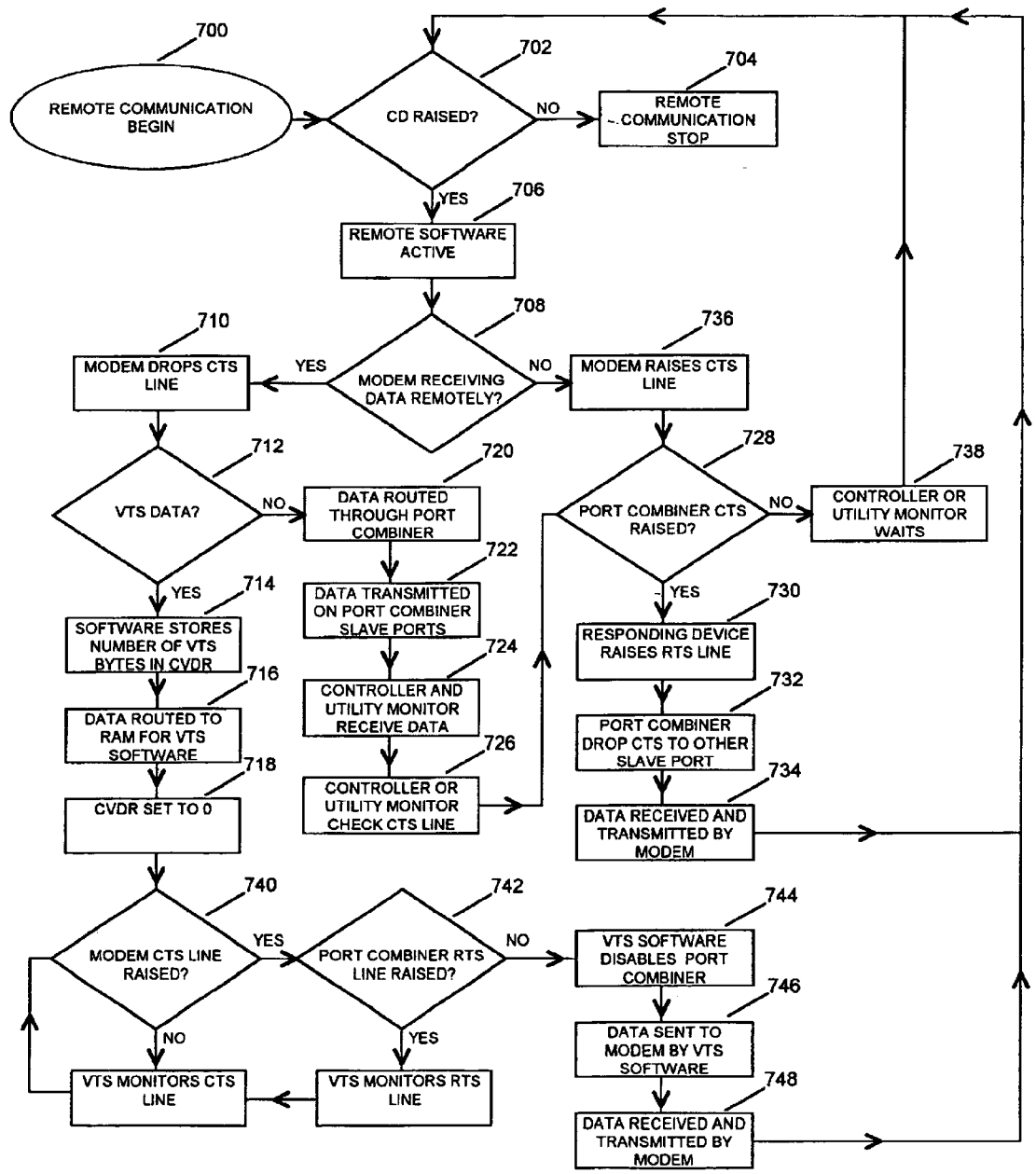
FIG. 7 is a block diagram showing a preferred embodiment of the remote communication function in accordance with the present invention.

Turning next to FIG. 7, shown is a block diagram of the remote communication function according to a preferred embodiment of the present invention. According to the invention, the remote communication is supported by modem 50 (see FIGS. 4–6B) and supporting software. The operating system of CPU 20 contains this necessary software to facilitate data flow in synchronous, asynchronous, and isynchronous formats.

As shown in FIG. 7, the internal modem card is connected with the remote communication modem 50 in step remote communication begin (700), wherein a carrier detect (CD) is raised. The system then checks whether a CD is raised (702). If not, the remote communication is stopped (704). If a CD is raised, then a software subroutine is initiated by this CD (706), which then determines whether modem 50 is receiving data remotely or not (708). If so, the internal modem card drops the clear to send (CTS) line (710) while it is receiving remote data. At this point, the subroutine instructs CPU 20 to route the data received by the internal modem card through 1 of 2 paths (712), as VTS data or controller/utility data. The leading data bit or bits of each data stream are referenced and controlled by CPU 20.

First, referring to the VTS data, VTS remote communication data byte packages are identified by a discrete and specific sequence of leading binary values. These values also identify the total number of bytes sent by the remote site. The value is stored in the VTS software variable Current VTS Data Receive (CVDR) (714). The subsequent bytes are routed to the RAM (716) of CPU 20 for processing by the VTS software. This routing is terminated once the total number of bytes is equal to the value of the CVDR. Once the routing is terminated, CPU 20 sets the value of CVDR back to 0 (718).

Additionally, the VTS software on CPU 20 performs all of the logical functions of the data received from the modem. For example, the data may request information from the VTS or VTS-RF sub-systems. Here, the information is retrieved from several sources. The VTS software database contains historical data. This data is retrieved from the fixed CPU data storage, commonly referred to as a hard drive. The modules therein contain current information that must be requested by CPU 20, through the RS-485 module network. Therefore, the VTS software obtains the data and generates data bytes.

On the other hand, data received without VTS or VTS-RF sub-system identification is routed to the master port of port combiner 46 in isynchronous format (720). Port combiner 46 sends this data through both ports 5 and 6, the slave ports (722). Controller 22 and utility monitor 24 receive the data simultaneously, wherein they each check the data to determine whether it is data which is acceptable for processing. In other words, controller 22 and utility monitor 24 check the CTS line (726) to determine whether the port combiner CTS has been raised (728). Then, the matching controller/controller-RF or utility/utility-RF sub-system (can only be one), raises the RTS line (730) and accepts the data for processing. Port combiner 46 then drops the CTS line to the other slave port (either port 5 or 6) (732), and the data is received and transmitted by the modem (734). Any information request within the data is processed by the respective sub-system that accepts the data.

Additionally, the VTS or VTS-RF sub-system monitors the CTS line state of modem 50 (740) as well as the ready to send (RTS) line state of the master port of port combiner 46 (742). The VTS or VTS-RF sub-system, having data to be sent to a remote computer, checks both lines, and if CTS is raised on modem 50 and the RTS is dropped from port combiner 46, the VTS or VTS-RF sub-system forces port combiner 46 to drop the CTS, thereby disabling port combiner 46 (744). The respective slave ports are subsequently dropped as well, to prevent any data collision. Now, the data is sent to modem 50 by the VTS software (746), which is then transmitted by modem 50 (748). Thereafter, control of the CTS line of port combiner 46 is restored, and the system again determines whether CD has been raised (702).

Further, referring to FIG. 25, port combiner 46 emulates the CTS line of modem 50 on both slave ports (ports 5 and 6). Once the CTS line is raised, the sub-system (either controller or utility), having data ready to be sent to a remote computer, will raise its RTS line. The port combiner then raises its master port RTS line to the modem, while port combiner 46 drops its CTS line to the alternate slave port, effectively preventing any data collision. Thereafter, the data is transmitted.

Lastly, port combiner 46 measures the speed of data bit transmission. Based on the speed (or baud rate), port combiner 46 waits for one idle bit time frame to elapse at the active slave port. It then raises the CTS line to the alternate slave port. Also, the lowering of the RTS line by the transmitting sub-system will cause port combiner 46 to raise the alternate slave port CTS.

CPU Network Data

Figure 8:
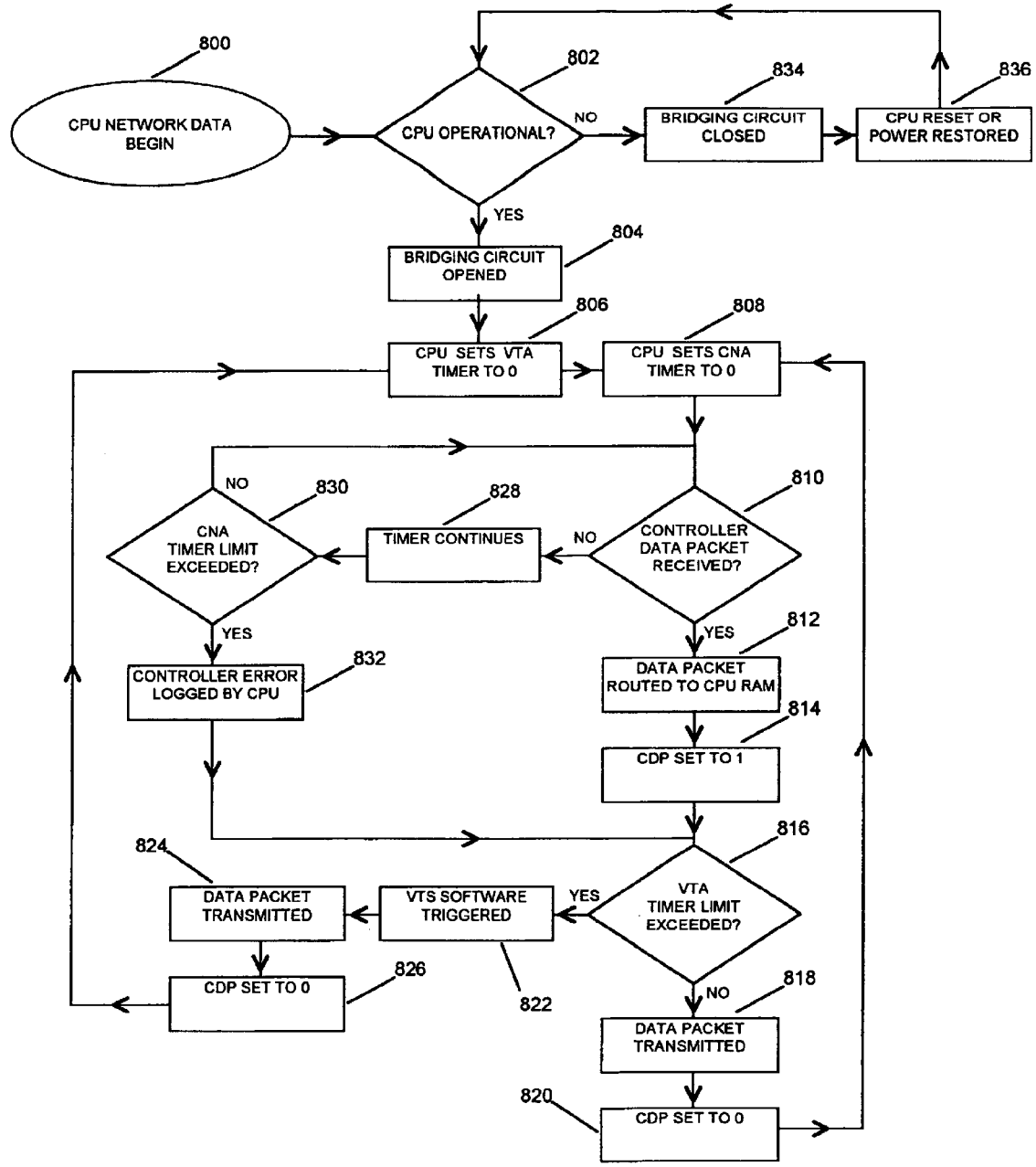
FIG. 8 is a block diagram showing a preferred embodiment of the CPU network data operations in accordance with the present invention.

Turning next to FIG. 8, shown is a block diagram of the CPU network data operations according to a preferred embodiment of the present invention. According to the invention, the CPU network data is supported by CPU 20 (see FIGS. 4–6B) and supporting software. The operating system (OS) of CPU 20 contains the necessary software to facilitate data flow in synchronous, asynchronous, and isynchronous formats.

Initially, upon CPU network data begin (800), the system checks to see if CPU 20 is operational (802). If not, then the bridging circuit remains closed (834), and CPU 20 is reset or its power is restored (836). On the other hand, if CPU 20 is operational, then the bridging circuit is opened (804), and CPU 20 sets the Vendor Tracking Activity counter/timer (VTA) to 0 (806), and sets the Controller Network Activity counter/timer (CNA) to 0 (808).

It is important to note here that CPU 20 initiates at least two clock counters. The first counter is the Controller Network Activity counter/timer (CNA), which tracks the time elapsed between data packets flowing through the RS-485 network from, and to, controller 22. The second counter is the VTA, which tracks the time elapsed since the last data was sent to the VTS modules. Note, the CPU network complies with the Electronics Industry Association (EIA) standards for RS-485 balanced voltage digital interface circuits.

Consequently, all CPU network data packets begin with addressing bit(s). Here, all modules have a discrete binary address, and each data packet transmitted on the network is generated by or passes through CPU 20. The data packets sent or received by controller 22 reset the CNA timer. The maximum time elapse between controller 22 or module 32 data exchange is stored as a dynamic system variable. The CNA variable is monitored by the operating system (OS). The OS maintains the second variable Last Controller Network Activity (LCNA). The LCNA retains the last value of CNA in one millisecond (1 ms) intervals. Also, the LCNA facilitates system diagnostics.

Controller 22 actively communicates with its module(s) 32, 42, thereby creating a distinct timing pattern in respect to the data exchange. Each module(s) 32, 42 communicate only as a response from controller 22. Additionally, controller 22 can only verify module(s) 32, 42 operation by a time limitation for module(s) 32, 42 response. This time limit is unique to each equipment manufacturer, i.e., ranging from 50 milliseconds to several minutes. This inherent timing element is used by CPU 20 to communicate with VTS module(s) 30, 40, or to control and/or communicate with any other module(s).

Next, the data packet is transmitted by controller 22 and is received by CPU 20 (810). Then, CPU 20 routes the data packet(s) to the on-board RAM (812), and sets the system variable Controller Data Packet (CDP) to the logic state of 1 (814). CPU 20 then checks the current timer value of VTA (816), which indicates the time elapsed since the last data was sent to the VTS modules. If the VTA timer has exceeded its limit, i.e., equal to, or greater, than 100 milliseconds, the VTS software is triggered (822), and the data packet is transmitted from RAM to CPU 20 (824). Upon completion of the transmission, the CDP, the VTA and the CNA are reset to 0 (826, 806, 808).

On the other hand, if the data packet was not received by CPU 20, then the both CNA and VTA timers continue (828). This continues either until the data packet is received by CPU 20 (see above description), or until the CNA timer exceeds its limit (830). At this point a controller error is logged by CPU 20 (832) and the system proceeds again to determine whether the VTA timer has exceeded its limit (816). If so, see above description. If not, then the data packet is transmitted from RAM to CPU 20 (818). Here, upon completion of the transmission, only the CDP and CNA are reset to 0 (820, 808), while the VTA timer continues.

The transmission of the data packet, from RAM, occurs on the RS-485 network on port 8. This transmission is also sent to RF master 26, as well as all VTS module(s) 30, 40, module(s) 32, 42, utility node(s) 34, 44, etc., on the network, either wired or RF satellite. Each module, satellite module, VTS module or VTS satellite module then compares the data packet address with its own binary address, whereby only the matching module, satellite module, VTS module or VTS satellite module accepts the data packet for processing. Here, the matching module, respectively, performs the logical functions invoked by the data packet. Then, acknowledgment and/or variable data is generated by the respective module. For example, module(s) 32, 42 address their data packets only to controller 22.

VTS System Architecture

Figure 16:
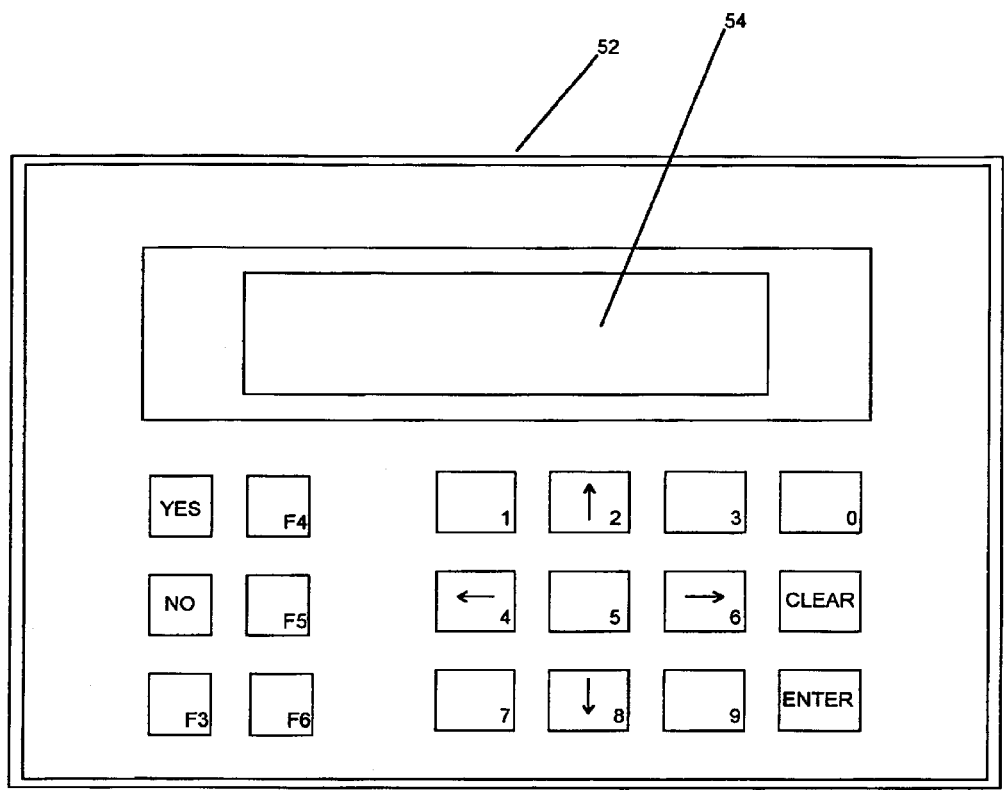
FIG. 16 shows a preferred embodiment of the face of a VTS input device in accordance with the present invention.

Referring next to FIG. 16, the VTS system in accordance with the present invention includes an operator interface terminal 52, such as one manufactured by Maple Systems. As shown, operator interface 52 comprises a screen 54 for viewing data or information in humanly perceivable form. The user can input information into or otherwise control operator interface 52 with the control keys shown in FIG. 16 and identified (from top to bottom and left to right) as YES, NO, F3, F4, F5, F6, 1, 4, 7, 2, 5, 8, 3, 6, 9, 0, CLEAR and ENTER.

VTS Software

The VTS software used to perform the vendor tracking functions in accordance with the present invention is contained in and run by CPU 20. This software checks the software variable Last Module Data exchange (LMOD), which is modified by a subroutine. The subroutine determines whether additional information is needed from the last module or whether to move on to the next sequential VTS module. The LMOD is set to the binary address of module selected, and the VTS software generates the data request of module variable status and/or variable values.

Next, CPU 20 requests the VTS module's address, LMOD, and logic function data. The complete data packet is sent to RAM, and is ready for transmission. Also, the VTS software sets the variable VTS Data Packet (VDP) to 1. Then, the VTS module matching the data packet address accepts the data, and the logic functions within the data packet are performed.

VTS Module Software

Each VTS module within the BCIS system retains a complete library of screen displays and pre-defined variables. There are several different embodiments of this VTS module. Each VTS module also contains a module resident program, which can be replicated. This particular application is effective for the multi-site data retrieval of similar operations. Additionally, the module resident program can be specific for each site containing unique screen displays and/or variables. This is effective for multi-site retrieval of dissimilar operations. Thus, within an entire BCIS system according to a preferred embodiment of the present invention, the module resident programs are a combination of replicated and site specific screen displays and/or variables. This facilitates the efficiency of program replication while accommodating the specific needs of all the operations.

Figure 13:
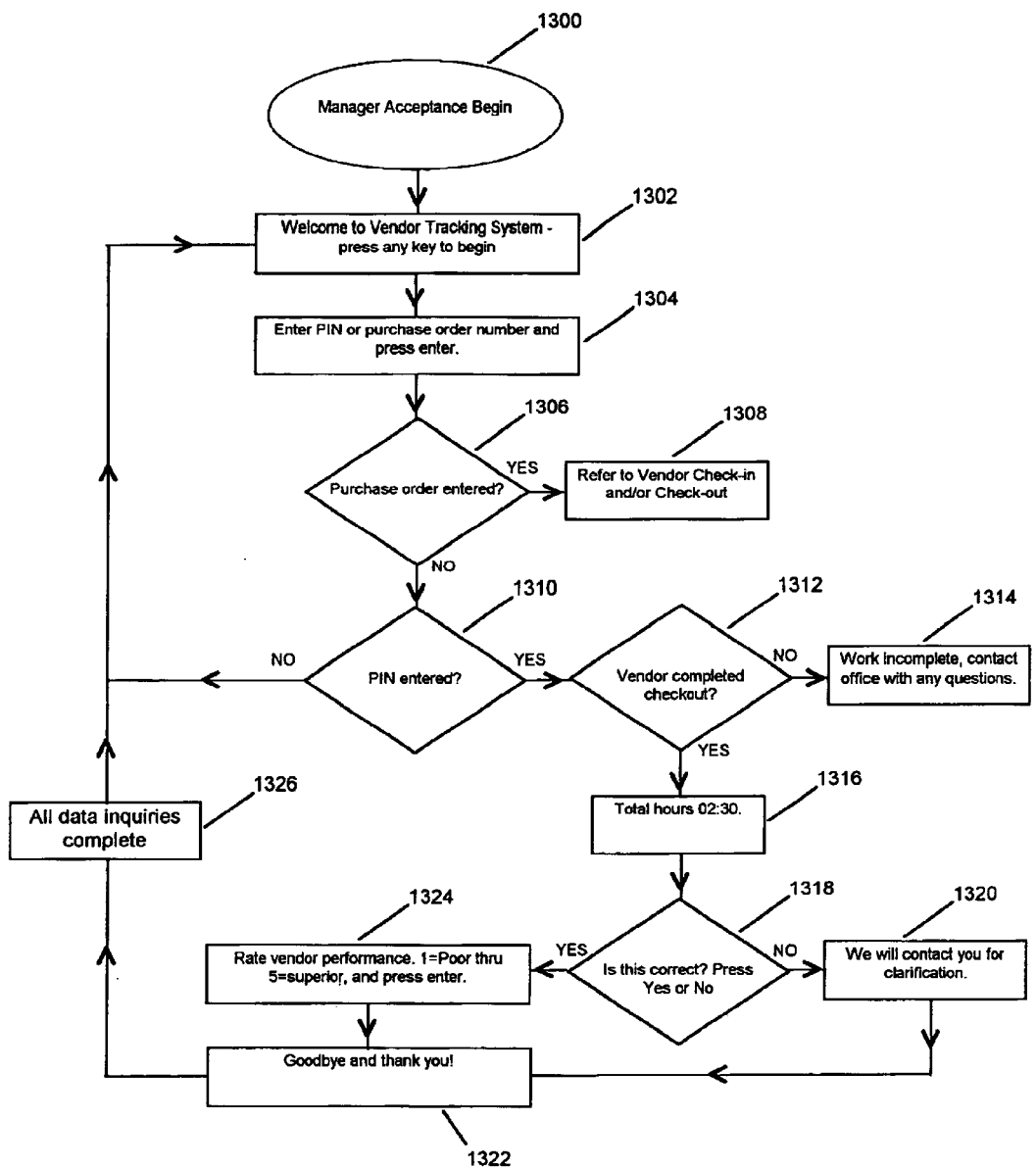
FIG. 13 is a block diagram showing a preferred embodiment of the VTS manager acceptance function in accordance with the present invention.
Figure 14:
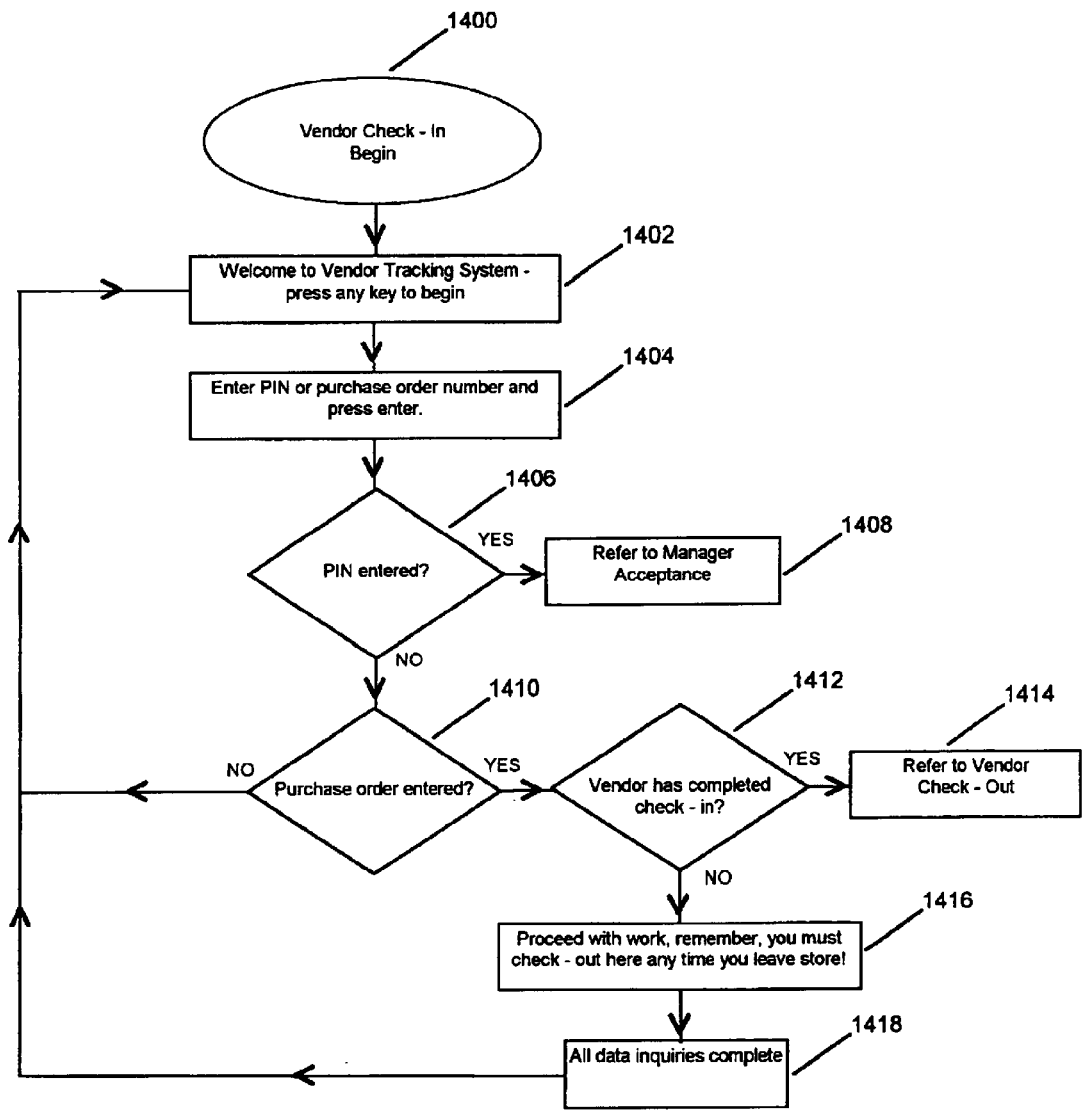
FIG. 14 is a block diagram showing a preferred embodiment of the VTS vendor check-in function in accordance with the present invention.
Figure 15:
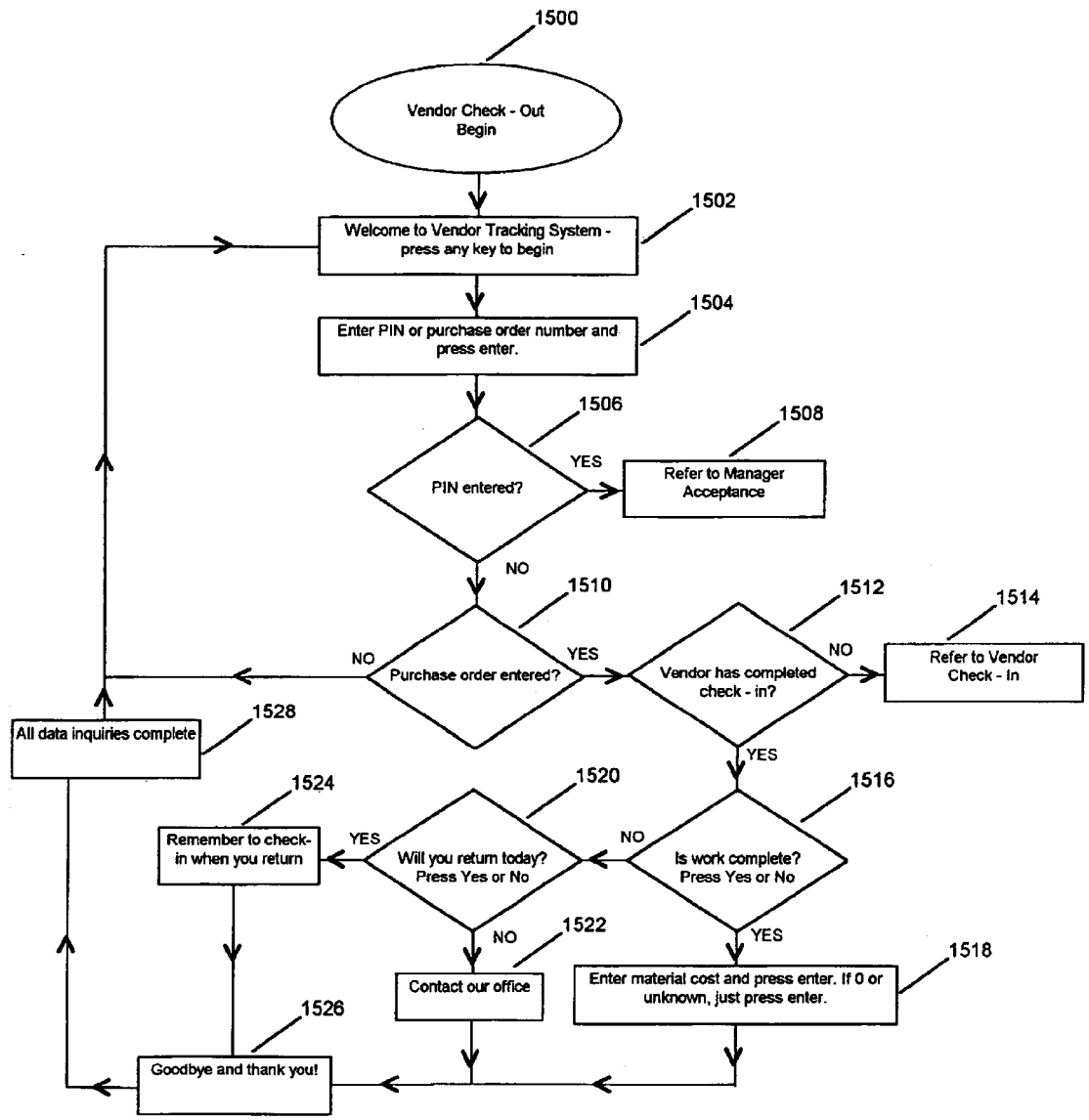
FIG. 15 is a block diagram showing a preferred embodiment of the VTS vendor checkout function in accordance with the present invention.

Referring now to FIGS. 13–15, shown are block diagrams representing a preferred embodiment of the VTS manager acceptance, the VTS vendor check-in function and the VTS vendor check-out functions of the vendor tracking system in accordance with the present invention.

In order for the VTS to function, the store manager (or other user of the system of this invention) must gain access to the VTS. As shown in FIG. 13, a preferred embodiment of this acceptance is demonstrated. Beginning with Manager Acceptance Begin (1300), the user views and inputs data into operator interface terminal 52 using the control keys, as described above. On screen 54, the VTS system informs the user that he/she has accessed the VTS system (1302) (e.g., the message "Welcome to the Vendor Tracking System" may be displayed on screen 54 of operator interface terminal 52). The system would then prompt the user to enter a PIN or purchase order number (1304). This provides both a form of security for the user and a method of organization of the users vendor tracking needs.

Now that the user has entered either a PIN number or a purchase order number, the system checks to see which one was entered, a purchase order number (1308) or a PIN number (1310). If a purchase order number was entered, the system refers to the vendor check-in function (FIG. 14) or the vendor check-out function (FIG. 15)—both described in greater detail below. On the other hand, if a PIN number was entered, the system then checks to see if the vendor completed his check-out (1312). If not, the system notes "Work Incomplete" and suggests contacting the office to answer any questions (1314). If the vendor did complete his check-out, then operator interface terminal 52 displays on screen 54 the total time the vendor was working (1316), and prompts the user to input (YES/NO) for whether this time is correct (1318). If NO, then the system informs the user to contact the vendor for clarification (1320), and then terminates the process (1322), possibly displaying on screen 54 the message "Goodbye and thank you!". If, however, YES is entered, then the user is further prompted to rate the vendor's performance (1324), for example, by entering 1 for poor through 5 for superior. The system now terminates (1322), possibly displaying on screen 54 the message "Goodbye and thank you!". At this point, all data inquiries are complete (1326), and operator interface terminal 52 again welcomes the user to the system (1302).

Referring next to FIG. 14, shown is a preferred embodiment of the vendor check-in operation of the VTS system according to the present invention. If the system sees that a purchase order has been entered (1410) (1308 of FIG. 13), then the system prompts the user to enter whether the vendor has completed the check-in (1412). If YES is entered, the system refers the user to vendor check-out (see description below for FIG. 15). If NO has been entered, operator interface terminal 52 displays a message on screen 54 informing the user to check-out whenever the user leaves the store (1416). At this point the system declares all data inquiries complete (1418) and returns the user to the welcome menu (1402).

Turning now to FIG. 15, shown is a preferred embodiment of the vendor check-out operation of the VTS system according to the present invention. If the system sees that a purchase order has been entered (1510)(1410 of FIG. 14) (1308 of FIG. 13), then the system prompts the user to enter whether the vendor has completed the check-in (1512)(1412 of FIG. 14). If NO is entered, the system refers the user to vendor check-in (see description above for FIG. 14). If, on the other hand, YES is entered, operator interface terminal 52 displays a prompt asking the user whether the work is complete (1516). If the response is NO, the system asks whether the user will return today (1520). If the response is NO, the system informs the user to contact the store's office (1522), and terminates the process with a message like "Goodbye and thank you!" (1526). If the user indicated that the work is complete, the system prompts the user to enter any material cost (1518) (or for any other information desired by the store), and then terminates the process with a message like "Goodbye and thank you!" (1526). Finally if the user did not complete the work and responded that the he/she would return the same day, then the system merely informs the user to check-in again when he/she returns (1524), and then terminates the process with a message like "Goodbye and thank you!" (1526). At this point the system declares all data inquiries complete (1518) and returns the user to the welcome menu (1502).

Remote RF Master Architecture

Referring next to FIGS. 20–22C, an alternate embodiment of RF master 26 is shown which uses the same enclosure as RF satellite 36 and is positioned remote from CPU 20 rather than being incorporated into the enclosure of CPU 20. In this embodiment, wireless communication is established to station modules by RF master 26 and synchronized to both frequency hop and spread spectrum. Both RF master 26 and station modules are provided with LED indicators 76 for visual verification. An example of an enclosure having such indicators is one manufactured by Nomadic Technologies.

Figure 21:
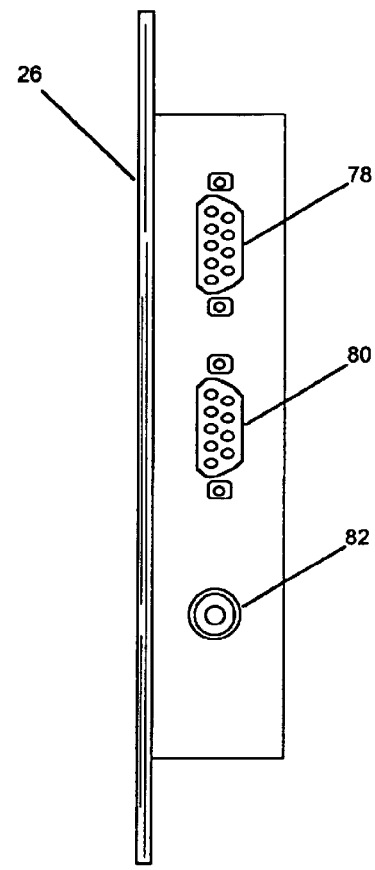
FIG. 21 shows a preferred embodiment of the bottom of the RF device (either master or satellite) in accordance with the present invention.
Figure 22A:
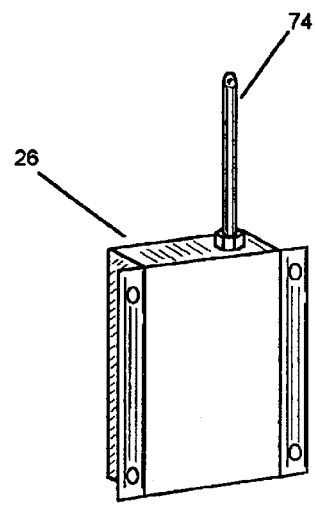
FIG. 22A shows a perspective view of a preferred embodiment of the RF device (either master or satellite), showing its top, right and back, in accordance with the present invention.
Figure 22B:
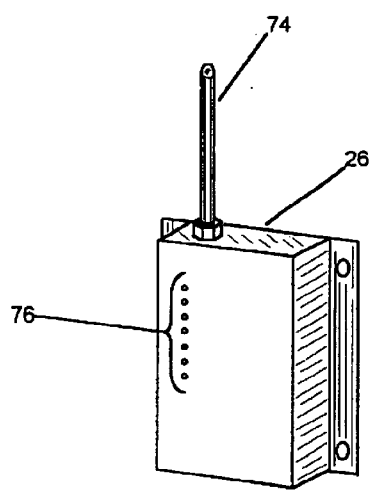
FIG. 22B shows a perspective view of a preferred embodiment of the RF device (either master or satellite), showing its top, right and front, in accordance with the present invention.
Figure 22C:
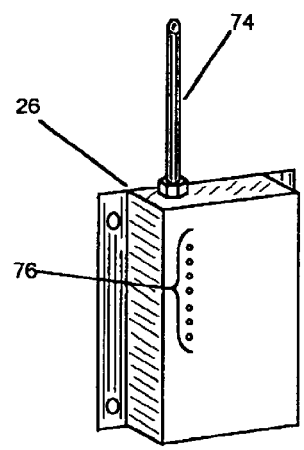
FIG. 22C shows a perspective view of a preferred embodiment of the RF device (either master or satellite), showing its top, left and back, in accordance with the present invention.

Additionally, this embodiment of the present invention includes an additional RS-232 DB9 connector, as shown in FIG. 21. Also, it includes digital conversion circuitry which is applied to the respective RS-485 network(s) for both conversion and data flow control.

Satellite Architecture

As shown in FIGS. 20–22C, the architecture of RF satellite 36 is the same as RF master 26 as a remote device. Included in the enclosure are LED indicators 76, external antenna and mounting 74, an RS-485 DB9 connector 80 and power connector 82. Such a device is manufactured by Nomadic Technologies. This invention further embodies a second connector, an RS-232 DB9 connector 78. Similar to the remote RF master 26, this RF satellite 36 embodies analog to digital converter (ADC) 212, a ROM table for data acquisition from ADC 212 and supporting software to facilitate ROM access and retrieval. Also, it may include digital conversion circuitry which is applied to the respective RS-485 network(s) for conversion and data flow control.

RF Network Protocol

Figure 9:
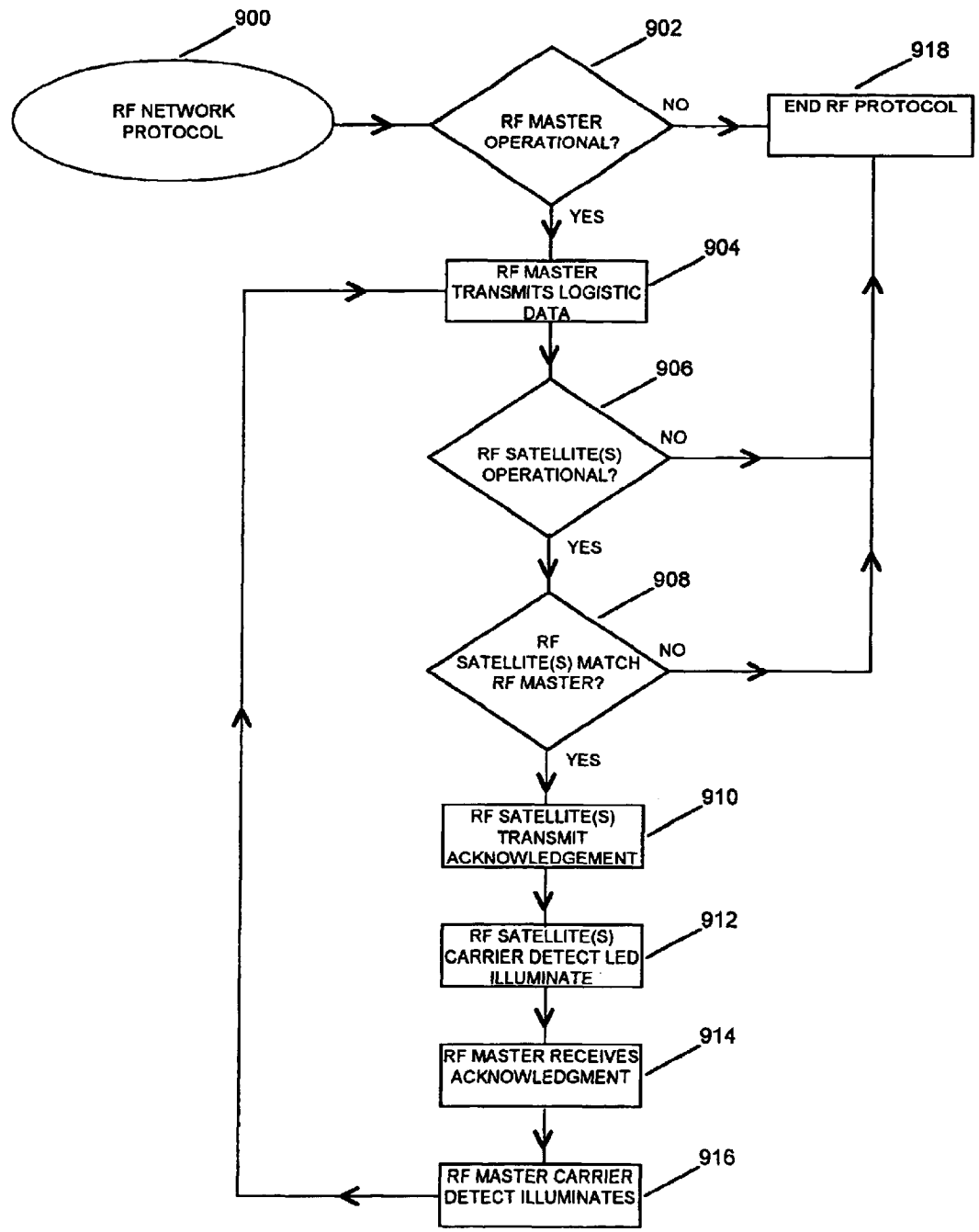
FIG. 9 is a block diagram showing a preferred embodiment of the RF network protocol function in accordance with the present invention.

Referring now to FIG. 9, shown is a block diagram of the RF network protocol (900). Here, wireless communication is established by RF master 26 (see FIG. 2A) with RF satellite(s) 36 (also see FIG. 2A). In a preferred embodiment, both RF master 26 and each of RF satellite(s)

36 are synchronized to frequency hop and spread spectrum algorithms. Completion of this operation is visually verified by the carrier detect (CD) indicator on RF master 26 and RF satellite 36.

Initially, the system checks to verify that RF master 26 is operational (902). If not, the RF network protocol ends (918). However, if RF master 26 is operational, then it transmits its master identity and logistical data, i.e., preprogrammed variables that include primary frequency and frequency hop algorithms, to RF satellite(s) 36 (904) where the system checks to verify whether it/they are operational (906). Again, if not, then the RF network protocol ends (918). However, if RF satellite 26 is operational, then radio communication is acknowledged by transmitting acknowledgment (910) back to RF master 26—this response only being generated by RF satellite units with the same variable configuration.

Thereafter, the CD LED indicator illuminates to indicate proper synchronization between RF master 26 and RF satellite(s) 36 and to show that at least one RF satellite 36 has responded. Note, the CD LED will not illuminate without at least one RF satellite(s) 36 acknowledgment. Further, RF satellite(s) 36 illuminates its/their CD LED once synchronized with RF master 26—RF satellite(s) 36 can only be synchronized by RF master 26. Although fully capable of communication from RF satellite 36 to RF satellite 36, a single coordination point is needed for primary frequency and hop algorithms.

In a preferred embodiment, the combination of frequency hopping and spread spectrum technology, in the 2.4 Gigahertz frequency range, of the present invention improves the system's resilience to interference from other signals in the vicinity. Additionally, this technology allows multiple wireless systems, using the same frequency range, to operate side by side, a distinct advantage of this invention.

Furthermore, this technology resolves most site propagation issues. However, alternate technologies, such as direct sequencing radio communication, can be employed to produce the desired result. The use of alternate radio transmission strategies, frequencies, and antenna types are determined on the site conditions and possible interference sources.

RF Operation

The prior technology of serial data radio communication provided for the conversion of data streams to data packets. This process involved many conversion strategies for packetizing the RS-232 flow of information. The RS-232 serial communication described here is not response-time dependent. On the other hand, the receiving device of an RS-232 data transmission may provide a response. However, the time elapsed before sending the response is not tracked as a performance threshold.

Initially, RS-232 data was divided into packets for wireless transmission. Flow controls were asserted or negated by both the transmitting device and the wireless device. This provided sufficient time for data packetizing and prevented any data collision. The stream of data of an RS-232 communication is unrestricted in data string length. That is, the string may range from single bytes to thousands of consecutive bytes, thereby causing RS-232 communication to be often referred to as a data stream.

In contradistinction, the present invention incorporates accelerated data broadcast timing. The RS-485 data is, by its nature, packetized. Therefore, the data packet processes of wireless communication are streamlined. Additionally, the RS-485 communication format employs certain limits of minimum and maximum data string length. This is necessary to accommodate the limited processing capability of the slave devices. In addition, excessively long data strings would conflict with the timing function for slave operation verification by controller 22 or VTS sub-system 316.

The prior art technology is improved by this invention by limiting the control of wireless data transmission to 3 trigger variables. These trigger variables are stored in non-volatile memory of RF master 26 or RF satellite 36. Any single, or combination of, trigger variables can initiate the wireless transmission—that is, to transmit, either wirelessly or conventionally, all of the buffered data immediately.

Data string length limits are defined within RF master processor IC 106 and RF satellite processor 206. Each counts the number of data packets within the data string it has received on its respective RS-485 network. Once the maximum limit is reached, the buffered data is immediately sent by RF master processor IC 106 and/or RF satellite processor 206 to the RF transceiver IC 104, 204 for wireless transmission. This function occurs independent of the other trigger variables. To complement this, the data received by RF master processor IC 106 and/or RF satellite processor 206 from the RF transceiver IC 104, 204 is immediately transmitted on its respective RS-485 network, once the maximum limit of data packets is reached. This function also occurs independent of the other trigger variables.

However, RF master processor IC 106 and RF satellite processor 206 retain a trigger variable for any network inactivity. Each monitors the timing of data flow on its respective RS-485 network. Network inactivity, meaning no data flow, in excess of this trigger variable value causes the buffered data immediately sent by RF master processor IC 106 and/or RF satellite processor 206 to the RF transceiver IC 104, 204 for wireless transmission. This allows data strings, under the maximum data string limit, to transmit within acceptable time constraints. Again, this function occurs independent of the other trigger variables. As a complement here, data received by RF master processor IC 106 and/or RF satellite processor 206 from RF transceiver IC 104, 204 is immediately transmitted on its respective RS-485 network—once this time based trigger is exceeded. This function also occurs independent of the other trigger variables.

Further, RF master processor IC 106 and RF satellite processor 206 retain a trigger variable which contains specific reference byte(s). These bytes are commonly referred to as delimiters. Delimiter(s) are repetitively used bytes that, among other things, can indicate the beginning or end of a data string.

Each manufacturer typically employs a unique language for RS-485 communication between the master and slave devices. The delimiters are stored in the non-volatile memory of RF master processor IC 106 and/or RF satellite processor 206. RF master processor IC 106 and/or RF satellite processor 206 recognition of a delimiter causes the buffered data to be immediately sent to the RF transceiver IC 104, 204 for wireless transmission. This function also occurs independent of the other broadcast variables. To complement this, the data received by RF master processor IC 106 and/or RF satellite processor 206 from the RF transceiver IC 104, 204 is immediately transmitted on its respective RS-485 network—once a delimiter is recognized. Finally, this function occurs independent of the other trigger variables.

Figure 10:
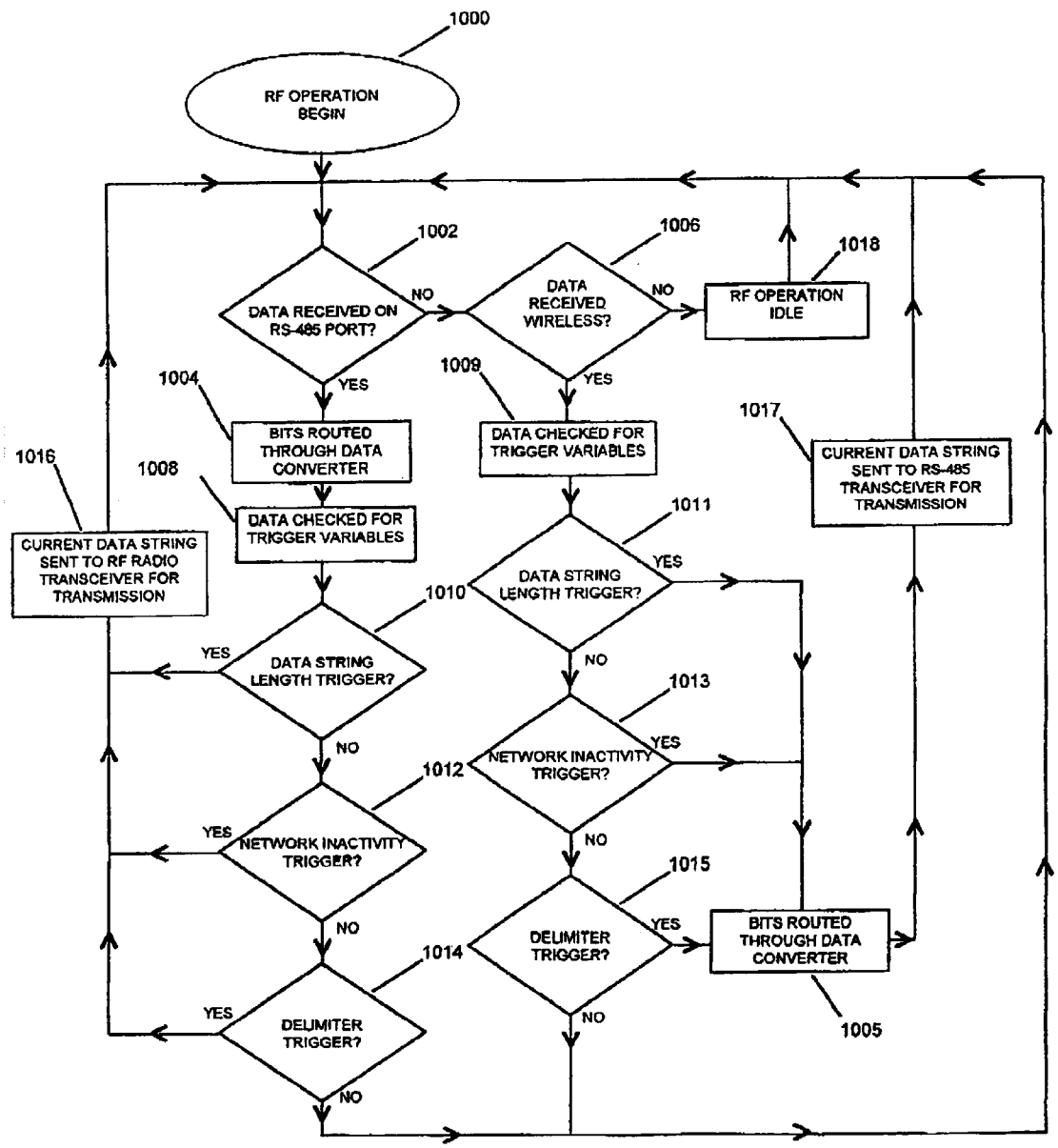
FIG. 10 is a block diagram showing a preferred embodiment of the RF operations in accordance with the present invention.
Figure 11:
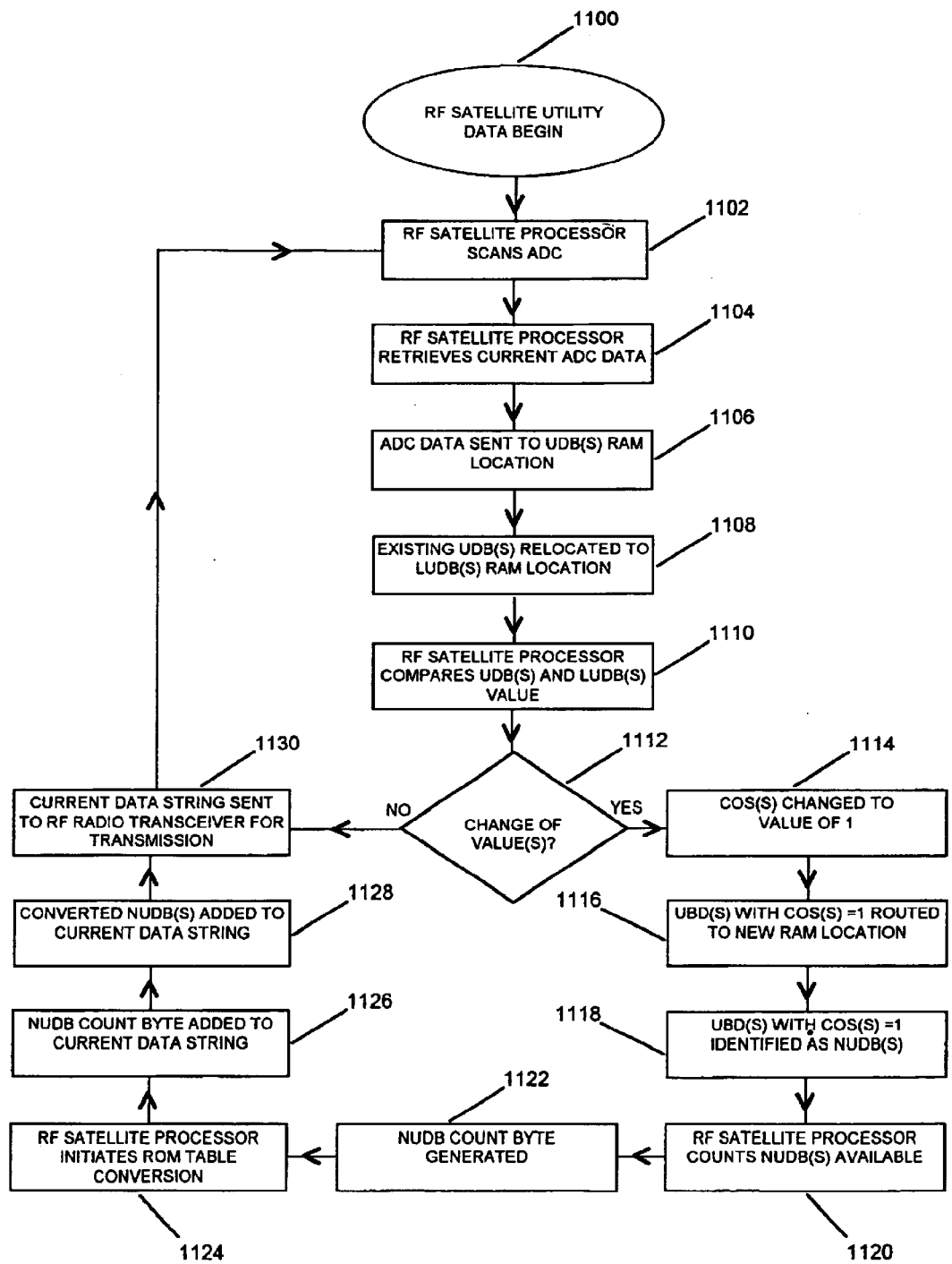
FIG. 11 is a block diagram showing a preferred embodiment of the RF satellite utility data operations in accordance with the present invention.

Referring now to FIG. 10, shown is a block diagram representing a preferred embodiment of the RF operations in accordance with the present invention. First, the RF operations begin (1000) and the system checks to see if any data has been received on the RS-485 port (1002). If not, the system checks to see if any wireless data (1006) has been received. If the response here is also NO, then the RF operation is idle and it continues to check for the receipt of data (either wirelessly or on the port RS-485) (1018).

On the other hand, if data is received on the RS-485 port (1002), then the data bits are routed through data converter 28 (1004), wherein the data is checked for any trigger variables (1008). Alternatively, if the data was found to be received wirelessly (1006), then the data bits are not routed through data converter 28, but, rather, are immediately checked for any trigger variables (1009). Since there are three types of trigger variables (i.e., data string length, network inactivity, and delimiter) for both data received on RS-485 port and wireless data, the system looks, independently, for each of them (1010, 1012, 1014, and 1011, 1013, 1015, respectively) until one is found.

At this point, the system sends the current data string, originating from the RS-485 port, to the RF radio transceiver for its transmission (1016). Alternately, the system routes the current data string, wireless origination, through the data converter 28 (1005). This data, being successfully converted is sent to the RS-485 transceiver for transmission (1017). This RF operation then repeats itself, beginning with looking for data received by the RS-485 port (1002).

RF Satellite Utility Data

Each RF satellite 36 is equipped with an analog to digital converter (ADC) 212, such as manufactured by B & B Electronics, or another comparable product. ADC 212 is accessed through the DB9 serial connector 78, shown in FIG. 21—pin 1 is system ground, pin 3 is analog input 1, pin 4 is analog input 2, pin 5 is analog input 3, pin 7 is analog ground reference. Also, satellite utility node(s) 44 are connected, by wire, to the DB9 connector 78.

In a preferred embodiment, up to three discrete analog inputs are available at the DB9 connector 78. The total number of input capability can be increased or decreased based on the ADC 212 IC installed. The analog ground reference, pin 7, is used collectively by all utility nodes 44 connected. The discrete analog outputs of utility node(s) 44 are connected individually to the DB9 connector pin(s) 3, 4, and 5.

When the RF utility monitoring system begins (1100), RF satellite processor 206 scans the current bit output of the ADC 212 (1102) at a minimum of 100 Hertz. RF satellite processor 206 then retrieves a new set of current data bits from the ADC 212 (1104), representing each independent utility node 44 output, with each scan. These data bits are sent to and stored in a fixed Utility Data Bit(s) (UDB(s)) RAM location of RF satellite processor 206 (1106). Multiple fixed UDB RAM locations are designated as UDB1, UDB2, UDB3, to correspond with its discrete analog input to ADC 212 and total number of ADC 212 inputs. With every scan, the existing data bits in UDB RAM are relocated to a second fixed UDB RAM location (1108), referred to as last utility data bits (LUDB). Multiple LUDB RAM locations are designated LUDB1, LUDB2, LUDB3, to correspond to its previous RAM location.

RF satellite processor 206 then compares each UDB with each LUDB, respectively (1110). In the event that a different bit value is identified, the Change of State (COS) logic variable is changed to the logic state of 1 (1114). Multiple COS variables are designated as COS1, COS2, COS3, thereby corresponding with its discrete ADC 212 input. The corresponding UDB is then moved to a final RAM location (1116) referred to as New Utility Data Bits (NUDB) (1118). Multiple NUDB RAM locations are designated as NUDB1, NUDB2, NUDB3, thereby corresponding to its discrete ADC 212 input. The respective COS logic variable is then changed back to the logic state of 0.

Note, more than one NUDB can be generated for each ADC 212 input during the time elapse between RF satellite processor 206 data transmissions. Here, thirty-two (32) NUDB variables can be assigned to each ADC 212 input. The multiple, or stacked, NUDB variables for each ADC 212 input are accessed in descending order by RF satellite processor 206.

Next, the data packets received from the modules on the RF satellite network 18 trigger RF satellite processor 206 to count the number of occupied NUDB RAM locations for each ADC 212 input (1120). The binary value of the total count is added, as a single byte, immediately behind the leading data byte(s) (1122). The leading data byte(s) represent radio communication logistics. The data packets from satellite modules 42 and/or satellite VTS modules 40, on RF satellite network 18, are next in the data string.

RF satellite processor 206 then directs the conversion of ADC 212 data bits to bytes (1124). This is accomplished by routing the each NUDB binary value to the ROM input/output buffer (ROM I/O). The ROM I/O locates the byte equivalent of the NUDB data bit values. The ROM table byte contains the corresponding output number and new output value. The ROM I/O buffer then sends the byte(s) to RF satellite processor 206. In turn, the byte(s) are added to the end of the current data string (1128). In turn, RF satellite processor 206 sends the completed data string to the RF transceiver 204 for transmission to RF master 26 (1130). All NUDB RAM is then cleared by RF satellite processor 206, and the process is then repeated at block (1102).

RF Master Utility Data

Turning next to FIG. 12, upon receipt by RF satellite processor 206 of utility information from utility node 44, RF satellite 36 immediately transmits the data to RF master processor 106 and the RF master utility data process begins (1200). Here, the NUDB count byte is first extracted from the data string and is received by RF master processor 106 (1202). This byte informs RF master processor 106 to extract the last number of byte(s) identified by NUDB count byte from the data string for use as utility data (1204). This data is not relayed to the respective RS-485 network. Rather, RF master processor 106 routes the NUDB byte(s) (1206) to the RS-232 transceiver for serial data transmission through the DB9 serial port (1208) to the DAC. The DAC is connected to this DB9 serial port, through which it receives the data packet containing the discrete output number and the new output value (1210). The DAC then performs the logical function to change the state of the selected output point from analog to a voltage, milliamp, or digital response (1212). The output port(s) of the DAC are wired to the inputs on utility monitor 24, respectively, to simulate direct connection of satellite utility node(s) 44. This process is then repeated at block (1202).

Data Conversion—General

Figure 23:
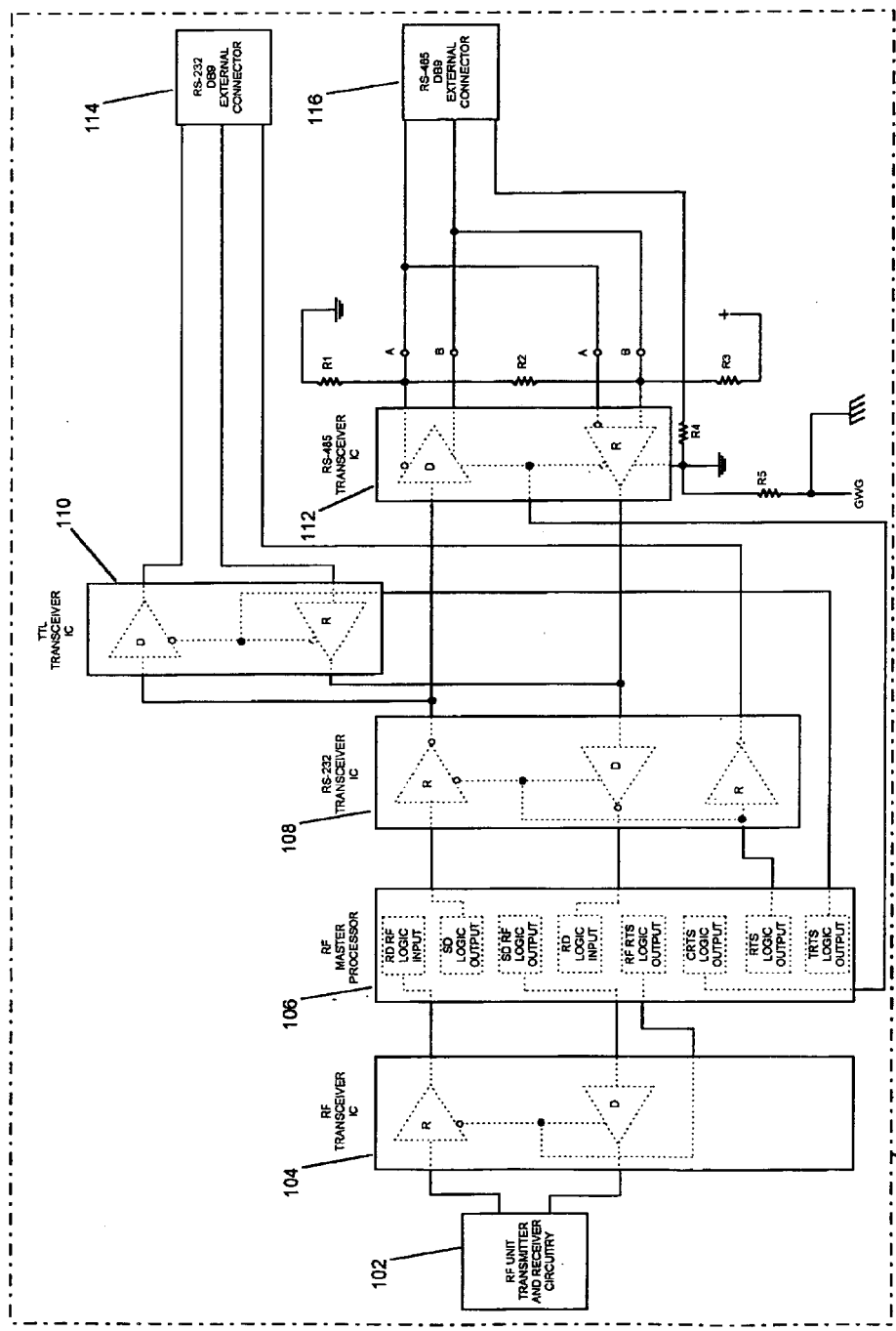
FIG. 23 shows a preferred embodiment of the data conversion circuitry of the RF master processor for use with the wireless integrated building control and information system with wireless networking in accordance with the present invention.
Figure 24:
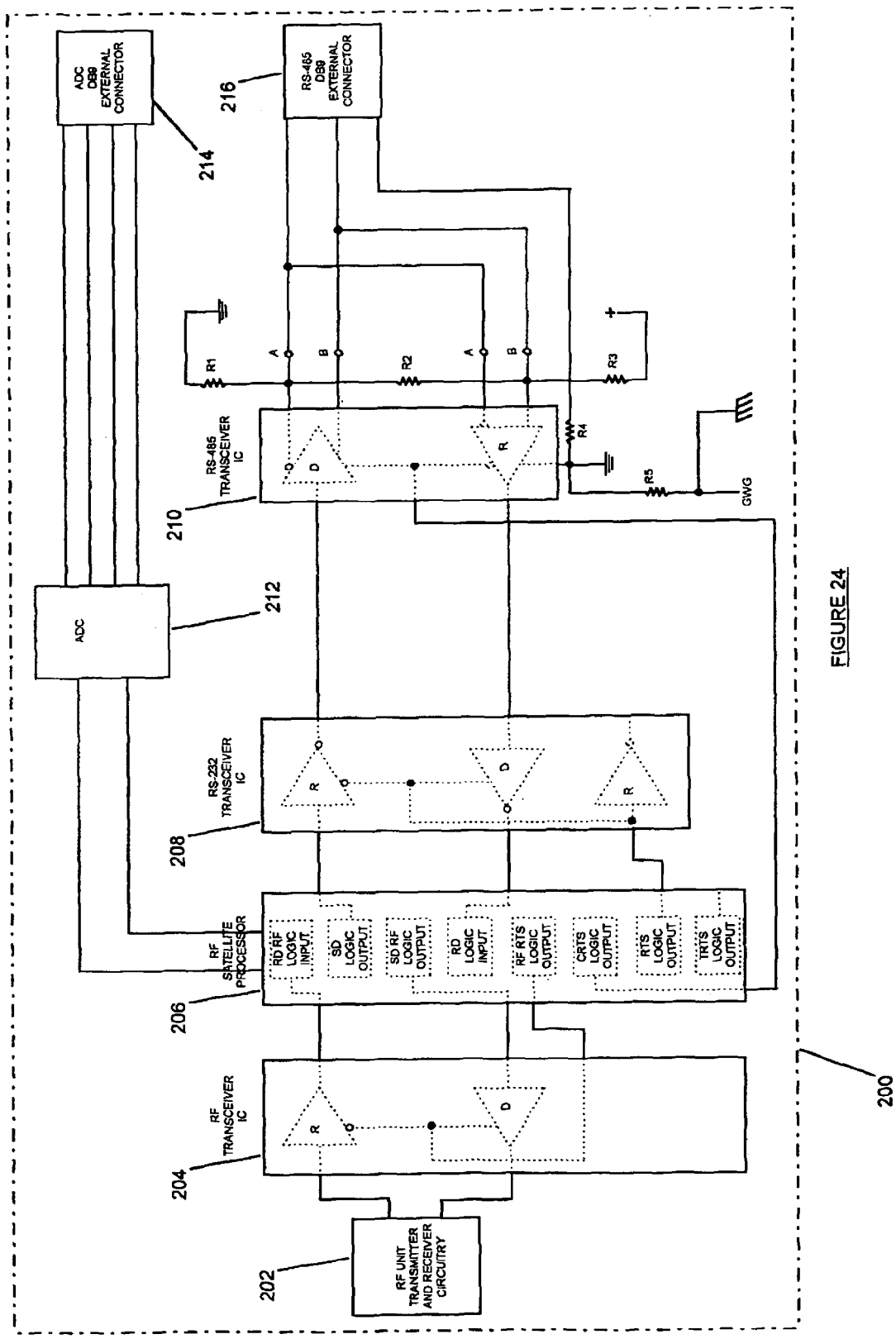
FIG. 24 shows a preferred embodiment of the data conversion circuitry of the RF satellite processor for use with the wireless integrated building control and information system with wireless networking in accordance with the present invention.

Turning now to FIGS. 23 and 24, represented are the RS-485 to RS-232 conversion circuitry of a preferred embodiment of the present invention. This circuitry is incorporated into both RF master 26 and RF satellite 36 enclosure(s). Further, this is an economical alternative to the expense of using the four (4) wire cabling required of other digital interfaces, including a four (4) wire version of an RS-485 network. An RS-485 network can reliably support multiple nodes, and is an efficient method to distribute the logical processes of a control system through a network, thereby reducing the process demands of the master device.

As an alternate embodiment of the two (2) wire RS-485 transceiver integrated circuit (IC) is the independent cabling of the driver and receiver resulting in a four (4) wire RS-485 network. Line A and Line B represent the negative and positive communication lines of RS-485 digital interface circuits which comply with EIA standards. Line G represents the cable shield, also referred to as a drain. Line A and Line B of RS-485 transceiver IC 112, 210 driver (D) and receiver (R) are not connected. Also, the RS-485 to RS-232 conversion circuitry is modified by independently biasing and terminating Line A and Line B.

Another embodiment is RS-422 transceiver IC installed in place of the RS-485 transceiver IC 112, 210 shown. The basic circuit design remains unchanged, however, the biasing and termination resistance require adjustment in accordance with EIA standards.

Another embodiment is RS-423 transceiver IC installed in place of the RS-485 transceiver IC 112, 210 shown. The basic circuit design remains unchanged, however, biasing and termination resistance require adjustment, in accordance with EIA standards.

The above embodiments illustrate only three alternate sub-system communication architectures. The intent of this invention is to accommodate the variety of current digital interface circuits while allowing future enhancements to be incorporated. Additional embodiments include coaxial, twisted pair, and fiber optic connectors, with their associated transceiver ICs, which facilitate wide area network (WAN), and local area network (LAN) application(s).

Another embodiment provides DB9 connector 78 as an RS-232 serial port. This configuration allows the use of the variety of standard converters currently manufactured.

Certain manufactures employ a proprietary digital interface. Therefore, this embodiment facilitates the use of non-standard sub-system communication architecture. The use of a proprietary digital interface implies the transceiver would not be readily available for incorporation into RF master 26 and RF satellite 36, and therefore, a manufacturer could provide the RS-232 converter without compromising its architecture.

In addition, this embodiment allows direct application of RS-232 devices in a multi-node configuration. This embodiment employs similar data transfer as described in remote communications. RF master 26 or RF satellite(s) 36 supporting multiple RS-232 devices incorporates port combiner 46. Port combiner 46, as described above, is installed in a cascade configuration up to the number of RS-232 devices attached. Each of port combiner 46 functions, as described above in greater detail, allows capture and release of the data path by the transmitting device. Thus, a single RS-232 device connected to RF master 26 or RF satellite 36 is connected directly to the DB9 external connector, respectively.

Remote RF Master Data Conversion

Referring first to FIG. 23, RF master processor (106), within RF master 26 (see FIG. 2A), raises its RTS Logic Output and TRTS Logic Output to values of 1, while the RF RTS Logic Output and CRTS Logic Output out are lowered to values of 0. The raised RTS Logic Output enables RS-232 Transceiver IC (108) driver (D) and is inverted by the RS-232 Transceiver IC receiver (R). This inverted output of RS-232 Transceiver IC (108) receiver (R) is connected to the RTS pin of ADC DB9 External Connector 214. Then, the lowered RF RTS Logic Output enables the receiver (R) of the RF Transceiver IC (104), and the lowered CRTS Logic Output enables the receiver (R) of RS-485 Transceiver IC (112). This is the condition that occurs when network activity is not present or when the network is in the listening state.

In this listening state, RF master processor 106 is waiting for network activity, or data transmission, from either RF Transceiver IC (104) on RD RF Logic Input, or RS-485 Transceiver IC (112) on RD Logic Input.

RF to RS-485 Conversion

Upon the leading edge of the first data bit received from RF Transceiver IC (104) on the RD RF Logic Input, RF master processor (106) lowers the RTS Logic Output, which enables RS-232 Transceiver IC (108) receiver (R). The RTS Logic Output is then inverted by RS-232 Transceiver IC (108) receiver (R). The inverted output of RS-232 Transceiver IC (108) receiver (R) is then raised, and the leading data bit(s) identify the data string as controller data, VTS data, and/or utility data packets.

First, controller data is routed to the RAM of RF master processor (106), which raises the CRTS Logic Output. This enables RS-485 Transceiver IC (112) driver (D), and RF master processor (106) completes its logical functions, including VTS and/or Utility data processes, and transmits controller data on the SD Logic Output. RF master processor (106) then lowers the CRTS Logic Output in one clock cycle, thereby disabling RS-485 Transceiver IC (112) driver (D).

Second, RF master processor (106) routes any VTS data to RAM, and raises the CRTS Logic Output. This enables RS-485 Transceiver IC (112) driver (D). The RF master processor (106) completes its logical functions, including controller and/or utility data processes, and transmits VTS data through the SD Logic Output. RF master processor (106) then lowers the CRTS Logic Output in one clock cycle after the data transmission. Then, RS-485 Transceiver IC (112) driver (D) is disabled.

Third, utility data is routed to the RAM of RF master processor (106), which lowers the RTS Logic Output and the CRTS Logic Output. This enables TTL Transceiver IC (110) driver (D) and receiver (R), and the lowered CRTS Logic output disables RS-485 Transceiver IC (112) driver (D). RF master processor (106) completes its logical functions, including VTS and/or Utility data processes, and transmits the utility data. RF master processor (106) then raises the RTS Logic Output in one clock cycle after data transmission.

Lastly, RF master processor (106) returns to its listening state at the next clock cycle after transmission of each type of data, whether controller, VTS and/or utility, is completed.

RF Master Data Conversion—(RS-485 to RF)

This data conversion begins with RF master 26 in the listening state. Upon the leading edge of the first data bit received from RS-485 Transceiver IC (112) on the RD Logic Input, RF master processor (106) raises the RF RTS Logic Output. The raised RF RTS Logic Output enables RF Transceiver IC (104) driver (D), wherein the leading data bit(s) identify the data string as controller data and/or VTS data packets. The data is then routed to the RAM of RF master 26, and RF master processor (106) completes its logical functions, including the utility data processing.

Next, RF master processor (106) transmits the data on SD RF Logic Output, at which time RF master processor (106) lowers the RF RTS Logic Output in one clock cycle after data transmission. Then, RF Transceiver IC (104) driver (D) is disabled, and RF master 26 returns to its listening state at the next clock cycle after transmission of each type of data is completed, whether controller, VTS and/or utility.

RF Master Data Conversion—(RF to RS-485)

This data conversion process again begins with RF master 26 in the listening state. Again, the data is then routed to the RAM of RF master 26, wherein the leading data bit(s) identify the data string as controller data, VTS data and/or utility data packets. Next, RF master processor (106) routes controller and VTS data to the backplane communication bus of CPU 20 for processing. RF master processor (106) then completes its logical functions, including the utility data processes, and RF master processor (106) returns to its listening state at the next clock cycle after data transmission of each type of data is completed, whether controller, VTS and/or utility.

RF Satellite Data Conversion—(RF to RS-485)

Turning now to FIG. 24, this data conversion process begins with RF satellite 36 (see FIG. 2A) in the listening state. As with the RF MASTER DATA CONVERSION, upon the leading edge of the first data bit received on RF Transceiver IC (204), RF satellite processor (206) lowers the RTS Logic Output. This lowered RTS Logic Output enables RS-232 Transceiver IC (208) receiver (R), and the leading data bit(s) identify the data string as controller data, VTS data and/or utility data packets.

Here, the controller and VTS data is routed to the RAM of RF satellite processor (206). RF satellite processor (206) then raises its CRTS Logic Output. This enables RS-485 Transceiver IC (210) driver (D). Then, RF satellite processor (206) completes its logical functions, including the utility data processes, and transmits the controller and/or VTS data. Then, RF satellite processor (206) lowers the CRTS Logic Output in one clock cycle, disabling RS-485 Transceiver IC (210) driver (D). Thereafter, RF satellite processor (206) returns to its listening state at the next clock cycle after the data transmission is completed.

RF Satellite Data Conversion—(RS-485 to RF)

This data conversion process again begins with RF satellite 36 in the listening state. Upon the leading edge of the first data bit received on RS-485 Transceiver IC (210), RF satellite processor (206) raises the RF RTS Logic Output. This raised RF RTS Logic Output enables RF Transceiver IC (204) driver (D).

Again, the controller and VTS data is routed to the RAM of RF satellite processor (206), wherein RF satellite processor (206) completes its logical functions, including the utility data processes, and transmits the controller and/or VTS data. RF satellite processor (206) then lowers the RF RTS Logic Output in one clock cycle, disabling RF Transceiver IC (204) driver (D), and RF satellite processor (206) returns to its listening state at the next clock cycle after the data transmission is completed.

Circuit Component Specification

As depicted in FIGS. 23 and 24, the data conversion circuitry include the following:

1) R1 and R3, which represent 4700 ohm, ¼ watt resistors to provide network biasing;
2) R2, which represents a 120 ohm, ¼ watt termination resistor; and
3) R4 and R5, which represent 100 ohm, ¼ watt resistors, signal ground to earth ground and earth ground to case ground to electrical distribution system ground, respectively.

As shown, R1 and R3 create a negative two hundred (−200) millivolt difference between Line A and Line B in a network idle state. The termination resistor, R2, is applied across Line A and Line B to reduce reflection of the transmitted signal on the cable. Then, R4 and R5 are used to reduce the ground potential currents. In FIGS. 23 and 24, Line A and Line B are the communication lines of the two (2) wire RS-485 network. Additionally, a positive two hundred (+200) millivolt condition from Line A to Line B represents the logic state of 0, while a negative two hundred (−200) millivolt condition from Line A to Line B represents the logic state of 1.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. An integrated building and control system wherein said system comprises:

a master control network including a first radio frequency (RF) device for providing a wireless communication interface with at least one remotely-located satellite network, a user interface, and a central processing unit;

at least one said satellite network comprising a second RF device for providing a wireless communication interface with said master control network, a plurality of nodes/modules for detecting information, at least one utility node, and a vendor tracking system; and a communication system including said first and second RF devices;

wherein said satellite network receives data from and transmits data to said master control network via said RF communication system, wherein said system allows for end user control of said nodes/modules, wherein said central processing unit transmits information from said first RF device to said user interface, wherein said central processing unit is coupled to said first RF device, wherein said first RF device receives said information from said second RF device, and wherein said utility node detects utility information and transmits said utility information to said satellite device.

2. A system according to claim 1, wherein said vendor tracking system comprises a monitor and at least one vendor tracking module.

3. A system according to claim 1, wherein said vendor tracking system further comprises:

at least one vendor tracking module for collecting vendor tracking data, processing said data and transmitting said data through data conversion circuitry to said second RF device for transmission to said master control network.

4. A system according to claim 1, wherein said master control network further comprises:

at least one utility node; and a utility monitor;

wherein said utility nodes detect utility information and transmit said information to said utility monitor and said central processing unit.

5. A system according to claim 4, wherein said utility node detects utility information and transmits said information to said second RF device; and wherein said second RF device transmits said information to said first RF device.

6. A system according to claim 1, wherein said vendor tracking system comprises an operator interface terminal.

7. A system according to claim 1, wherein each said second RF device comprises:

a data conversion circuit for converting said data received from at least one said node/module for transmission via said communication system;

wherein at least one of said nodes/modules is a vendor tracking module for collecting vendor tracking data and transmitting said vendor tracking data through said data conversion circuit in said second RF device for transmission to said master control network.

8. A system according to claim 1, wherein said master control network further comprises:
  at least one vendor tracking system module;
  wherein said user interface provides a user with access and control of said system, and wherein said central processing unit is capable of receiving information from each said vendor tracking system module, and wherein said first RF device receives information from said second RF device and transmits said information through a data converter to said central processing unit for display via said user interface.

9. A system according to claim 1, wherein said master control network further comprises a vendor tracking system.

10. A system according to claim 9, wherein said vendor tracking system comprises a monitor and at least one vendor tracking module.

11. A system according to claim 1, wherein said master control network further comprises a data conversion and transmission unit.

12. A system according to claim 11, wherein said data conversion and transmission unit includes data conversion circuitry for converting said data received from said central processing unit for transmission to said satellite network.

13. A system according to claim 1, wherein each said satellite network further comprises:
  a data conversion and transmission unit for receiving data from said satellite node/module and transmitting said data to said master control network.

14. A system according to claim 13, wherein said data conversion and transmission unit includes data conversion circuitry for converting said data received from said satellite node/module for transmission to said master control network.

15. An integrated building control and information system for providing bi-directional wireless communication, control, and/or monitoring of a plurality of devices and/or services, wherein said system comprises:
  a single master control network comprising a plurality of subsystems for providing local control and monitoring of devices and/or services, a central processing unit (CPU), and a data conversion and transmission unit from said CPU and transmitting said data to at least one of said satellite networks; and
  a radio frequency (RF) communication system for providing bi-directional communication between said master control network and a plurality of satellite networks, wherein said each satellite network is positioned remote from said master network and comprises at least one satellite node/module for receiving and transmitting data;
  wherein at least one said subsystem comprises a plurality of local nodes/modules for receiving and transmitting data, and a vendor tracking system (VTS) node/module for collecting vendor-related data and transmitting said data to said CPU.

16. A system according to claim 15, wherein said data conversion and transmission unit includes data conversion circuitry for converting said data received from said CPU for transmission to said satellite network via said RF communication system.

17. A system according to claim 15, wherein each said satellite network further comprises:
  a data conversion and transmission unit for receiving data from said satellite node/module and transmitting said data to said master control network.

18. A system according to claim 17, wherein said data conversion and transmission unit includes data conversion circuitry for converting said data received from said satellite node/module for transmission to said master control network via said RF communication system.

19. A system according to claim 15, wherein at least one of said satellite nodes/modules is a vendor tracking system (VTS) for collecting vendor-related data and transmitting said data to said master control network.

20. A system according to claim 19, wherein said VTS comprises a monitor and at least one vendor tracking module.

21. A system according to claim 19, wherein said VTS further comprises at least one vendor tracking module for collecting vendor tracking data, processing said data and transmitting said data.

22. A system according to claim 15, wherein said master control network further comprises:
  at least one utility node; and
  a utility monitor;
  wherein said utility nodes detect utility information and transmit said information to said utility monitor and said CPU.

23. A system according to claim 15, wherein said master control network further comprises a vendor tracking system.

24. A system according to claim 23, wherein said vendor tracking system comprises a monitor and at least one vendor tracking module.

25. A system according to claim 23, where said vendor tracking system further comprises:
  at least one vendor tracking module for collecting vendor tracking data, processing said data and transmitting said data.

26. A system according to claim 23, wherein said vendor tracking system comprises an operator interface terminal.

27. A system according to claim 9, where said vendor tracking system further comprises:
  at least one vendor tracking module for collecting vendor tracking data, processing said data and transmitting said data.

28. A system according to claim 9, wherein said vendor tracking system comprises an operator interface terminal.

* * * * *